United States Patent
Tanaka et al.

[19]

[11] Patent Number: 6,163,360
[45] Date of Patent: Dec. 19, 2000

[54] LIQUID CRYSTAL DISPLAY APPARATUS

[75] Inventors: Tomio Tanaka, Hachioji; Jun Ogura; Satoru Shimoda, both of Fussa; Tetsushi Yoshida, Kanagawa-ken, all of Japan

[73] Assignee: Casio Computer Co., Ltd., Tokyo, Japan

[21] Appl. No.: 08/878,812

[22] Filed: Jun. 19, 1997

[30] Foreign Application Priority Data

| Jun. 24, 1996 | [JP] | Japan | 8-181692 |
| Jun. 28, 1996 | [JP] | Japan | 8-186897 |
| Jun. 28, 1996 | [JP] | Japan | 8-186898 |
| Jul. 30, 1996 | [JP] | Japan | 8-215923 |
| Sep. 6, 1996 | [JP] | Japan | 8-255283 |

[51] Int. Cl.[7] ............... C09K 19/02; G02F 1/1335; G09G 3/36
[52] U.S. Cl. ............... 349/172; 349/174; 349/95; 349/37; 345/97
[58] Field of Search ............... 345/97; 349/172, 349/37, 174, 95; 359/56

[56] References Cited

U.S. PATENT DOCUMENTS

| 5,061,044 | 10/1991 | Matsunaga | 359/56 |
| 5,061,045 | 10/1991 | Yoneya et al. | 359/56 |
| 5,555,110 | 9/1996 | Konuma et al. | 345/97 |
| 5,638,196 | 6/1997 | Mouri et al. | 345/97 |
| 5,646,754 | 7/1997 | Takeda et al. | 349/172 |
| 5,781,266 | 7/1998 | Nakao et al. | 349/172 |
| 5,847,790 | 12/1998 | Andersson et al. | 349/172 |

FOREIGN PATENT DOCUMENTS

| 63-226624 | 9/1988 | Japan . |
| 1-288826 | 11/1989 | Japan . |
| 3-274090 | 12/1991 | Japan . |
| 5-019261 | 1/1993 | Japan . |
| 5-80101 | 4/1993 | Japan . |
| 5-297350 | 11/1993 | Japan . |
| 5-303081 | 11/1993 | Japan . |
| 6-214261 | 8/1994 | Japan . |
| 6-289367 | 10/1994 | Japan . |
| 7-311373 | 11/1995 | Japan . |
| 7-334130 | 12/1995 | Japan . |
| 8-054605 | 2/1996 | Japan . |

OTHER PUBLICATIONS

Patent Abstracts of Japan, vol. 017, No. 290 (P–1549), Jun. 3, 1993 & JP 05 019261 A (Seiko Epson Corp.), Jan. 29, 1993.

Patent Abstracts of Japan, vol. 015, No. 051 (P–1163), Feb. 6, 1991 & JP 02 282724 A (Seiko Epson Corp.), Nov. 20, 1990.

Patent Abstracts of Japan, vol. 096, No. 003, Mar. 29, 1996 & JP 07 311373 A (Citizen Watch Co., Ltd.), Nov. 28, 1995.

Primary Examiner—Frank G. Font
Assistant Examiner—Zandra V Smith
Attorney, Agent, or Firm—Frishauf, Holtz, Goodman, Langer & Chick, P.C

[57] ABSTRACT

Placed between a pair of substrates is a liquid crystal which has a first ferroelectric phase where liquid crystal molecules are aligned substantially in a first direction in accordance with an applied voltage, a second ferroelectric phase where the liquid crystal molecules are aligned substantially in a second direction in accordance with an applied voltage, and an intermediate alignment state where the director of the liquid crystal is directed between the first and second directions. The liquid crystal in use is selected so that the first and second directions intersect each other at an angle of greater than 45°. The transmission axis of one of a pair of polarization plates is set inclined to an intermediate direction between the first and second directions by 22.5°, and the optical axis of the other polarization plate is set perpendicular to the transmission axis of the former polarization plate. A voltage of a range which does not set the liquid crystal in a ferroelectric phase and can provide maximum and minimum transmittances is applied between electrodes which are so arranged as to sandwich a layer of the liquid crystal.

67 Claims, 22 Drawing Sheets

FIG.8A GATE SIGNAL
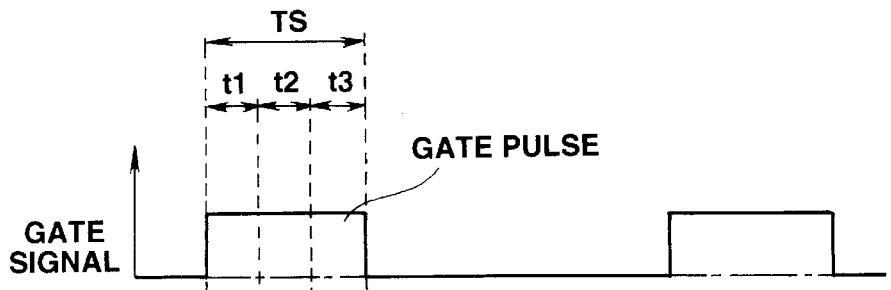
FIG.8B DATA SIGNAL
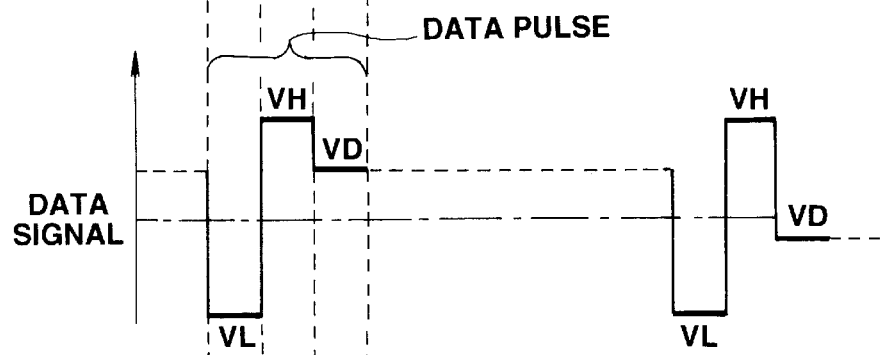
FIG.8C TRANSMITTANCE
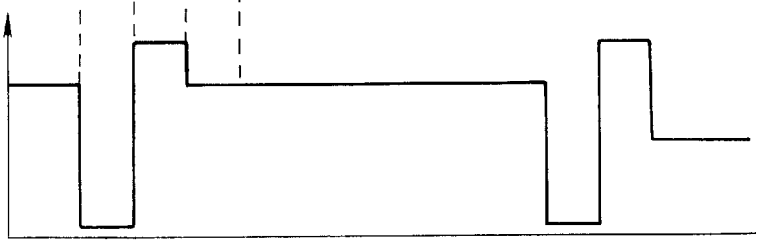

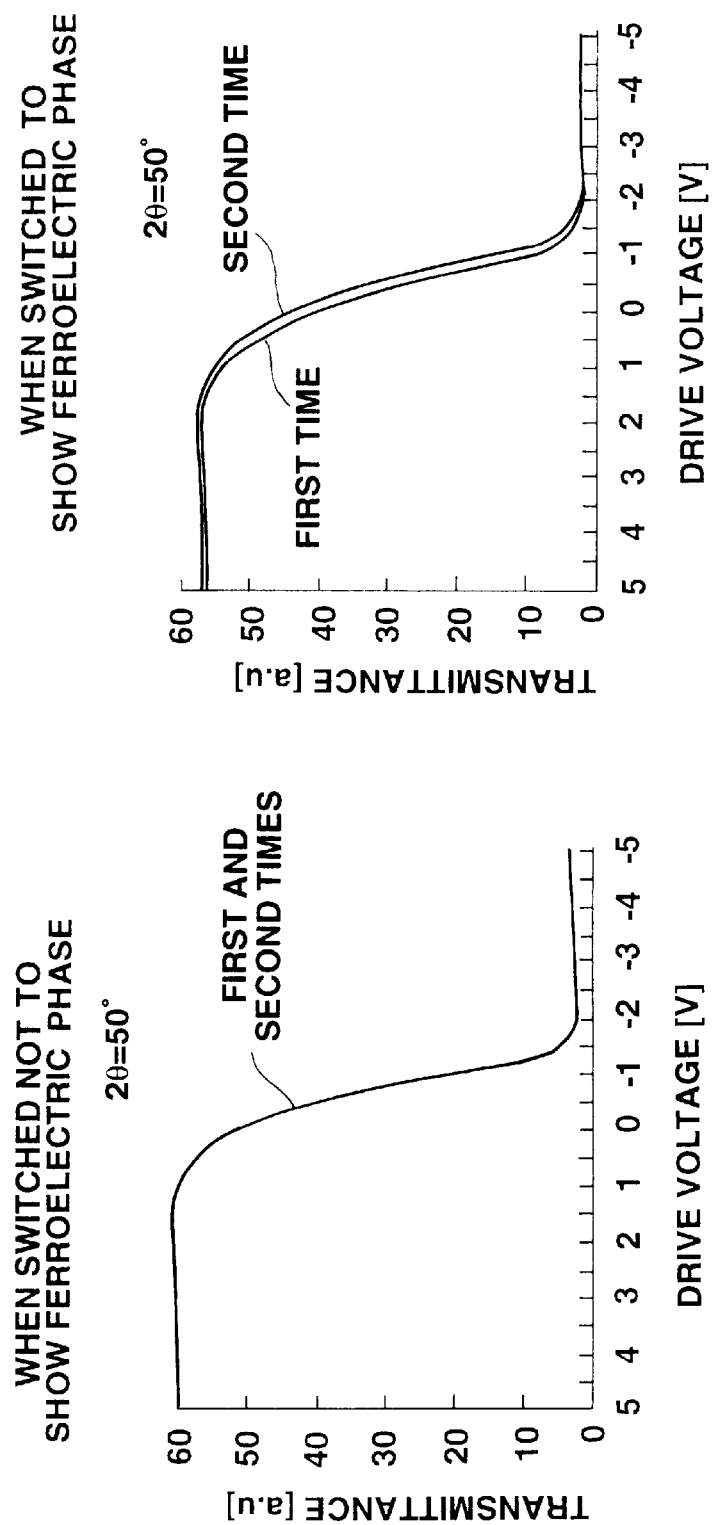

LIQUID CRYSTAL DISPLAY APPARATUS

FIELD OF THE INVENTION

The present invention relates to a liquid crystal display apparatus, a liquid crystal display device and a method of driving a liquid crystal display device.

DESCRIPTION OF THE RELATED ART

Development has been made on liquid crystal display (LCD) devices which use a ferroelectric liquid crystal (FLC), antiferroelectric liquid crystal (AFLC) or the like and are expected to have a fast response characteristic and a wide angle characteristic in place of conventionally popular LCD devices using a nematic liquid crystal. Those LCD devices have an FLC or AFLC located between a pair of substrates on whose opposing surfaces electrodes are formed.

An LCD device using an FLC is so designed as to be driven to display a desired image by using the bistable property of having a first alignment state where liquid crystal (LC) molecules are aligned in one ferroelectric phase by the application of a predetermined voltage of one polarity between the opposite electrodes, and a second alignment state where the LC molecules are aligned in another ferroelectric phase by the application of a predetermined voltage of the other polarity between the opposite electrodes.

An LCD device using an AFLC is so designed as to be driven to display a desired image by using the tri-stable property of having a first alignment state where LC molecules are aligned in one ferroelectric phase by the application of a predetermined voltage of one polarity between the opposite electrodes, a second alignment state where the LC molecules are aligned in another ferroelectric phase by the application of a predetermined voltage of the other polarity between the opposite electrodes, and a third alignment state where LC molecules are aligned in an antiferroelectric phase when no electric field is applied between the opposite electrodes, Those LCD devices demonstrate binary display by aligning the LC molecules in a stable state of a ferroelectric phase or antiferroelectric phase and using the memory effect. Those LCD devices have a difficulty in presenting gradation display with excellent reproducibility.

As an FLC device capable of ensuring gradation display has been proposed an LCD device which uses a DHF (Deformed Helical Ferroelectric) liquid crystal. A DHF LCD device has an FLC placed between a pair of substrates in a state where a helix formed by its molecules exists. In this DHF LCD device, the directors of the LC molecules are continuously changed from one ferroelectric phase to another ferroelectric phase by deforming the helix in accordance with an applied electric field.

Also proposed recently is an AFLC display device which presents gradation display using an intermediate alignment state which some AFLC shows.

The LC molecules of the aforementioned FLC and AFLC have a permanent dipole in a direction substantially perpendicular to the long molecular axis, and behave by the direct mutual actions of the permanent dipole and the electric field. This ensures a fast response and permits the director to be changed within a plane parallel to the substrates, thus widening the angle of visibility.

As those liquid crystals have a spontaneous polarization, however, electric charges of the opposite polarity to the spontaneous polarization stored on the substrate sides. Accordingly, the mutual actions of the LC molecules and the substrates are increased so that the LC molecules cannot behave sufficiently freely in accordance with the electric field. This brings about a display burning phenomenon where an image remains as an afterimage.

As one way to suppress display burning, a driving scheme of inverting the polarity of the voltage to be applied to the liquid crystal frame by frame or line by line has been proposed. Also proposed is another driving scheme which applies, for each drive pulse, a compensation pulse of the opposite polarity to that of the drive pulse,.

Those schemes cannot however sufficiently eliminate the local storage of electric charges and cannot thus prevent display burning. Since the response of a liquid crystal varies between pulses of positive and negative polarities, flickering occurs.

The alignment state of a liquid crystal having a spontaneous polarization varies in accordance with the temperature. Even when the same drive voltage is applied, therefore, the display gradation varies in accordance with a change in the temperature of the liquid crystal. This undesirably reduces the contrast and degrades the quality of a displayed image.

SUMMARY OF THE INVENTION

Accordingly, it is the first object of the present invention to provide an LCD apparatus and an LCD device, which use a liquid crystal exhibiting ferroelectric phases and which can suppress display burning and can display a high-grade image, and a method of driving such an LCD device.

It is the second object of the present invention to provide an LCD apparatus, which uses a liquid crystal exhibiting ferroelectric phases and which can display a high-grade image regardless of a temperature change, and a method of driving an LCD device to be used in such an LCD apparatus.

To achieve the first object, an LCD device according to the first aspect of this invention comprises:

a pair of substrates on whose opposing surfaces electrodes are formed;

a liquid crystal, exhibiting ferroelectric phases, being placed between the pair of substrates, and having a first alignment state exhibiting a first ferroelectric phase where liquid crystal molecules are aligned substantially in a first direction in accordance with a first voltage of one polarity applied between the electrodes, a second alignment state exhibiting a second ferroelectric phase where the liquid crystal molecules are aligned substantially in a second direction in accordance with a second voltage of the other polarity applied between the electrodes, and a third alignment state where a director of the liquid crystal is directed in a third direction substantially matching with a normal-line direction of a layer of a smectic phase when no voltage is applied between the electrodes, the director of the liquid crystal is directed between the first direction and the second direction in accordance with application of an arbitrary third voltage between the first voltage and the second voltage; and a pair of polarization plates, arranged so as to sandwich the pair of substrates and in such a way that an optical axis of one of the polarization plates is set in an angular range defined by either one of the first and second directions and the third direction and an optical axis of the other polarization plate is substantially perpendicular or parallel to the former optical axis.

This LCD device in which, for example, the angle of intersection between the first and second directions (cone angle 2θ) is set greater than 45°, is driven with the director of the liquid crystal between the direction of the optical axis of one of the polarization plates and a direction inclined 45° to the former direction. This LCD device can provide the maximum gradation and minimum gradation without setting the liquid crystal in a ferroelectric phase. The driving of the LCD device without setting the liquid crystal in a ferroelectric phase can suppress display burning. Because the display gradation of this LCD device is specifically determined in accordance with the applied voltage, so-called DC driving becomes possible, allowing flickering to be suppressed. As this LCD device uses the liquid crystal which exhibits ferroelectric phases, a fast response and a wide angle of visibility can be maintained.

In this LCD device, the optical axis of one of the polarization plates is set in a direction intersecting the third direction at an angle of approximately 22.5°.

Further, given that an angle defined by the first and second directions is 2θ, the optical axis of one of the pair of polarization plates is set in a direction intersecting the third direction at an angle of less than θ.

Alternatively, given that an angle defined by the first and second directions is 2θ, the optical axis of one of the pair of polarization plates is set in a direction intersecting one of the first and second directions at an angle obtained by subtracting 45° from the angle 2θ.

It is desirable that an angle 2θ defined by the first and second directions is equal to or greater than 45°.

In this case, the optical axis of one of the pair of polarization plates is set in a direction intersecting the third direction at an angle of less than θ.

The optical axis of one of the pair of polarization plates may be set in a direction intersecting the third direction at an angle of approximately 22.5°.

Alternatively, the optical axis of the one of pair of polarization plates may be set in a direction intersecting one of the first and second directions at an angle obtained by subtracting 22.5° from the angle 2θ.

The optical axis of one of the pair of polarization plates may be set in a direction intersecting one of the first and second directions at an angle obtained by subtracting 45° from the angle 2θ.

It is further desirable that an angle 2θ defined by the first and second directions is equal to or greater than 50°.

In this case, the optical axis of one of the pair of polarization plates is set in a direction intersecting the third direction at an angle of less than θ and greater than 22.5°.

The optical axis of one of the pair of polarization plates may be set in a direction intersecting the third direction at an angle equal to or greater than 2.5°.

The optical axis of one of the pair of polarization plates may be set in a direction intersecting the third direction at an angle equal to or greater than 5°.

It is further desirable an angle 2θ defined by the first and second directions is equal to or greater than 60°.

In this case, the optical axis of one of pair of polarization plates is set in a direction intersecting one of the first and second directions at an angle equal to or greater than 7.5°.

The optical axis of one of the pair of polarization plates may be set in a direction intersecting one of the first and second directions at an angle equal to or greater than 15°.

In this LCD device, the liquid crystal may be comprised of a liquid crystal having a monostable property.

The liquid crystal may also be comprised of an antiferroelectric phase liquid crystal showing a chiral smectic CA phase in a bulk state.

The liquid crystal may also be comprised of an antiferroelectric phase liquid crystal showing a smectic CA phase with no voltage applied between the electrodes.

The liquid crystal may also be comprised of a DHF (Deformed Helical Ferroelectric) liquid crystal.

The liquid crystal may also be comprised of a liquid crystal whose liquid crystal molecules are aligned between smectic layers without association.

The liquid crystal may also be comprised of a mixture of a liquid crystal compound showing a chiral smectic CR phase and a liquid crystal compound showing a chiral smectic C phase.

Alternatively, the liquid crystal may be comprised of an antiferroelectric phase liquid crystal compound having a chiral terminal chain bonded to ether and a phenyl ring subjected to fluorine reduction.

To achieve the first object, an LCD device according to the second aspect of this invention comprises:

a pair of substrates on whose opposing surfaces electrodes are formed;

a liquid crystal, exhibiting ferroelectric phases, being placed between the pair of substrates, and having a first alignment state exhibiting a first ferroelectric phase where liquid crystal molecules are aligned substantially in a first direction in accordance with a first voltage of one polarity applied between the electrodes, a second alignment state exhibiting a second ferroelectric phase where the liquid crystal molecules are aligned substantially in a second direction in accordance with a second voltage of the other polarity applied between the electrodes, and a third alignment state where a director of the liquid crystal is directed in a third direction substantially matching with a normal-line direction of a layer of a smectic phase when no voltage is applied between the electrodes, an angle 2θ defined by the first and second directions being equal to or greater than 90°, the director of the liquid crystal is directed between the first direction and the second direction in accordance with application of an arbitrary third voltage between the first voltage and the second voltage; and a pair of polarization plates, arranged so as to sandwich the pair of substrates and in such a way that an optical axis of one of the polarization plates is set in an angular range defined by the first and second directions and an optical axis of the other polarization plate is substantially perpendicular or parallel to the former optical axis.

To achieve the first object, an LCD device according to the third aspect of this invention comprises:

a pair of substrates on whose opposing surfaces electrodes are formed;

a liquid crystal, exhibiting ferroelectric phases, being placed between the pair of substrates, and having a first alignment state exhibiting a first ferroelectric phase where liquid crystal molecules are aligned substantially in a first direction in accordance with a first voltage of one polarity applied between the electrodes, a second alignment state exhibiting a second ferroelectric phase where the liquid crystal molecules are aligned substantially in a second direction in accordance with a second voltage of the other polarity applied between the electrodes, and a third alignment state where a director of the liquid crystal is directed in a third direction substantially matching with a normal-line direction of a layer of a smectic phase when no voltage is applied between the electrodes, an angle 2θ defined by the first and second directions being greater than 45°, the director of the liquid crystal are directed between the first direction and the second direction in accordance with application of an arbitrary third voltage between the first voltage and the second voltage; and a pair of polarization plates, arranged so as to sandwich the pair of substrates and in such a way that an optical axis of one of the polarization plates is set in an angular range defined by either one of the first and second directions and the third direction and an optical axis of the other polarization plate is substantially perpendicular or parallel to the former optical axis.

To achieve the first object, an LCD device according to the forth aspect of this invention comprises:

a pair of substrates on whose opposing surfaces electrodes are formed;

a liquid crystal, exhibiting ferroelectric phases, being placed between the pair of substrates, and having a first alignment state exhibiting a first ferroelectric phase where liquid crystal molecules are aligned substantially in a first direction in accordance with a first voltage of one polarity applied between the electrodes, a second alignment state exhibiting a second ferroelectric phase where the liquid crystal molecules are aligned substantially in a second direction in accordance with a second voltage of the other polarity applied between the electrodes, and a third alignment state where a director of the liquid crystal is directed in a third direction substantially matching with a normal-line direction of a layer of a smectic phase when no voltage is applied between the electrodes, the director of the liquid crystal is directed between the first direction and the second direction in accordance with application of an arbitrary third voltage between the first voltage and the second voltage; and a pair of polarization plates, arranged so as to sandwich the pair of substrates and in such a way that a half of an angle defined by optical axes of the polarization plates is smaller than an angle 2θ defined by the first and second directions.

In this LCD device, the optical axes of the pair of polarization plates are substantially perpendicular to each other.

One of the optical axes may intersect one of the first and second directions within an angular range defined by the first and second directions and at an angle obtained by subtracting an angle defined by the optical axes from the angle 2θ.

The optical axis of one of the pair of polarization plates may be set within an angular range defined by either one of the first and second directions and the third direction.

To achieve the first object, an LCD apparatus according to the fifth aspect of this invention comprises:

a pair of substrates on whose opposing surfaces electrodes are formed;

a liquid crystal, exhibiting ferroelectric phases, being placed between the pair of substrates, and having a first alignment state exhibiting a first ferroelectric phase where liquid crystal molecules are aligned substantially in a first direction in accordance with a first voltage of one polarity applied between the electrodes, a second alignment state exhibiting a second ferroelectric phase where the liquid crystal molecules are aligned substantially in a second direction in accordance with a second voltage of the other polarity applied between the electrodes, and a third alignment state where a director of the liquid crystal is directed in a third direction substantially matching with a normal-line direction of a layer of a smectic phase when no voltage is applied between the electrodes, the director of the liquid crystal is directed between the first direction and the second direction in accordance with application of an arbitrary third voltage between the first voltage and the second voltage;

a pair of polarization plates, arranged so as to sandwich the pair of substrates and in such a way that an optical axis of one of the polarization plates is set in an angular range defined by either one of the first and second directions and the third direction and an optical axis of the other polarization plate is substantially perpendicular or parallel to the former optical axis; and drive means for applying a voltage to the liquid crystal between the electrodes, the voltage causing the director of the liquid crystal to vary within an angular range narrower than an angle 2θ defined by the first and second directions.

In this LCD apparatus, the drive means drives the liquid crystal without setting the liquid crystal in a ferroelectric phase, so that display burning can be suppressed. Because the display gradation of this LCD apparatus is specifically determined in accordance with the applied voltage, so-called DC driving becomes possible, ensuring the suppression of flickering. As this LCD apparatus uses the liquid crystal which shows a ferroelectric phase, a fast response and a wide angle of visibility can be maintained.

In this LCD apparatus, the drive means can apply a voltage for changing the director of the liquid crystal within a range of 45°.

In this LCD apparatus, the optical axis of one of the pair of polarization plates becomes substantially parallel to one of fluctuation angles of the director of the liquid crystal.

It is desirable that the angle 2θ is equal to or greater than 45°, and more desirable the angle 2θ is equal to or greater than 50°. It is further more desirable that the angle 2θ is equal to or greater than 60°.

To achieve the first object, an LCD apparatus according to sixth aspect of this invention comprises:

a pair of substrates on whose opposing surfaces electrodes are formed;

a liquid crystal, exhibiting ferroelectric phases, being placed between the pair of substrates, and having a first alignment state exhibiting a first ferroelectric phase where liquid crystal molecules are aligned substantially in a first direction in accordance with a first voltage of one polarity applied between the electrodes, and a second alignment state exhibiting a second ferroelectric phase where the liquid crystal molecules are aligned substantially in a second direction in accordance with a second voltage of the other polarity applied between the electrodes, a director of the liquid crystal is directed between the first direction and the second direction in accordance with application of an arbitrary third voltage between the first voltage and the second voltage;

a pair of polarization plates, arranged so as to sandwich the pair of substrates and in such a way that optical axes of the polarization plates become perpendicular or parallel to each other; and drive means for applying a voltage to the liquid crystal between the electrodes, the voltage causing the director of the liquid crystal to vary within a range of an angle 2θ defined by the first and second directions and within an angular range for preventing the liquid crystal from becoming a ferroelectric phase.

In this LCD apparatus, the drive means drives the liquid crystal without setting the liquid crystal in a ferroelectric phase, so that display burning can be suppressed. Because the display gradation of this LCD apparatus is specifically determined in accordance with the applied voltage, so-called DC driving becomes possible, ensuring the suppression of flickering. As this LCD apparatus uses the liquid crystal which exhibits ferroelectric phases, a fast response a wide angle of visibility can be maintained.

In this LCD apparatus, the liquid crystal may have a third alignment state where a director of the liquid crystal is directed in a third direction substantially matching with a normal-line direction of a layer of a smectic phase when no voltage is applied between the electrodes, in which case the optical axis of one of the polarization plates may be set within an angular range defined by either one of the first and second directions and the third direction.

In this LCD apparatus, the drive means may apply a voltage for changing the director of the liquid crystal within an angular range less than the angle of 2θ.

It is desirable that the angle 2θ is equal to or greater than 45°, and more desirable the angle 2θ is equal to or greater than 50°. It is further more desirable that the angle 2θ is equal to or greater than 60°.

In this LCD apparatus, the drive means may have pulse voltage applying means for applying a pulse voltage corresponding to externally supplied image data to the liquid crystal.

In this LCD apparatus, the drive means may include:
 first pulse voltage applying means for applying a predetermined first pulse voltage to the liquid crystal; and
 second pulse voltage applying means for applying a second pulse voltage corresponding to externally supplied image data in such a way that the director of the liquid crystal is changed within an angular range defined by the first and second directions.

In this case, the drive means may further include:
 third pulse voltage applying means for applying a third pulse voltage equal in absolute value to the first pulse voltage but of an opposite polarity to that of the first pulse voltage, before application of the first and second pulse voltages by the first and second pulse voltage applying means; and
 fourth pulse voltage applying means for applying a fourth pulse voltage equal in absolute value to the second pulse voltage but of an opposite polarity to that of the second pulse voltage, before application of the first and second pulse voltages by the first and second pulse voltage applying means.

The first pulse voltage applied to the liquid crystal by the first pulse voltage applying means does not set the liquid crystal in a ferroelectric phase.

In the LCD devices according to the first to forth aspects or the LCD apparatus according to the fifth and sixth aspects, the electrodes formed on the opposing surface of one of the pair of substrates may be pixel electrodes arranged in a matrix form; and
 the electrodes formed on the opposing surface of the other one of the pair of substrates may be a common electrode formed in association with the pixel electrodes.

In this case, active elements respectively connected to the pixel electrodes may be formed on the opposing surface of the one of the pair of substrates; and
 the drive means may include:
  row selection means for selectively enabling the active elements connected to any row of pixel electrodes in the matrix;
  image data writing means for applying a voltage corresponding to externally supplied image data to the pixel electrodes selected by the row selection means via the enabled active elements; and
 reference voltage applying means for applying a reference voltage to the common electrode,
 whereby a voltage is applied to the liquid crystal by voltage application to the pixel electrodes and the common electrode.

In the LCD devices according to the first to forth aspects or the LCD apparatus according to the fifth and sixth aspects, the electrodes formed on the opposing surface of one of the pair of substrates may be a plurality of scan electrodes formed in parallel to one another;
 the electrodes formed on the opposing surface of the other one of the pair of substrates may be a plurality of signal electrodes formed in parallel to one another and substantially perpendicular to the plurality of scan electrodes, in which case the drive means may apply voltages to the plurality of scan electrodes and the plurality of signal electrodes to thereby apply a voltage to the liquid crystal.

To achieve the second object, an LCD apparatus according to the seventh aspect of this invention comprises:
 a pair of substrates on whose opposing surfaces electrodes are formed;
 a liquid crystal, exhibiting ferroelectric phases, being placed between the pair of substrates, and having a first alignment state exhibiting a first ferroelectric phase where liquid crystal molecules are aligned substantially in a first direction in accordance with a first voltage of one polarity applied between the electrodes, a second alignment state exhibiting a second ferroelectric phase where the liquid crystal molecules are aligned substantially in a second direction in accordance with a second voltage of the other polarity applied between the electrodes, and a third alignment state where a director of the liquid crystal is directed in a third direction substantially matching with a normal-line direction of a layer of a smectic phase when no voltage is applied between the electrodes, the director of the liquid crystal is directed between the first direction and the second direction in accordance with application of an arbitrary third voltage between the first voltage and the second voltage;
 a pair of polarization plates, arranged so as to sandwich the pair of substrates and in such a way that an optical axis of one of the polarization plates is set in an angular range defined by either one of the first and second directions and the third direction and an optical axis of the other polarization plate is substantially perpendicular or parallel to the former optical axis;
 drive means for applying a voltage to the liquid crystal between the electrodes, the voltage causing the director of the liquid crystal to vary within an angular range narrower than an angular range defined by the first and second directions; and
 contrast compensation means for controlling a voltage to be applied to the liquid crystal to thereby compensate a contrast of an image to be displayed by changing the director of the liquid crystal.

In this LCD apparatus, the drive means drives the liquid crystal without setting the liquid crystal in a ferroelectric phase, so that display burning can be suppressed. Because the display gradation of this LCD apparatus is specifically determined in accordance with the applied voltage, flickering can be suppressed. As this LCD apparatus uses the liquid crystal which exhibits ferroelectric phases, it is possible to keep a fast response and a wide angle of visibility.

The provision of the contrast compensation means in this LCD apparatus can permit an image to be displayed with the proper gradation even if the electro-optical characteristic of the liquid crystal changes due to a change in the temperature of the liquid crystal.

In this LCD apparatus, the drive means may have means for applying a first voltage corresponding to a maximum gradation of the image to be displayed and a second voltage corresponding to a minimum gradation of the image to be displayed to the liquid crystal.

In this LCD apparatus, the drive means may apply a voltage for causing the director of the liquid crystal to vary within a range of 45° to the liquid crystal.

In this LCD apparatus, the contrast compensation means may include:

temperature detection means for detecting a temperature of the liquid crystal; and voltage compensation means for compensating the voltage to be applied to the liquid crystal by the drive means, in accordance with the temperature detected by the temperature detection means.

In this case, the voltage compensation means may have means for compensating a range of a value of an applied voltage and an offset voltage in accordance with the temperature.

To achieve the first object, a method of driving a LCD device according to eighth aspect of this invention comprises:

a liquid crystal display device preparation step of preparing a liquid crystal display device comprising a pair of substrates on whose opposing surfaces electrodes are formed; a liquid crystal, exhibiting ferroelectric phases, being placed between the pair of substrates, and having a first alignment state exhibiting a first ferroelectric phase where liquid crystal molecules are aligned substantially in a first direction in accordance with a first voltage of one polarity applied between the electrodes, and a second alignment state exhibiting a second ferroelectric phase where the liquid crystal molecules are aligned substantially in a second direction in accordance with a second voltage of the other polarity applied between the electrodes, a director of the liquid crystal is directed between the first direction and the second direction in accordance with application of an arbitrary third voltage between the first voltage and the second voltage; and a pair of polarization plates, arranged so as to sandwich the pair of substrates and in such a way that optical axes of the polarization plates become perpendicular or parallel to each other; and a drive step of applying a voltage to the liquid crystal between the electrodes, the voltage causing the director of the liquid crystal to vary within such an angular range as not to set the liquid crystal in a ferroelectric phase.

Since this LCD device driving method drives the liquid crystal without setting the liquid crystal in a ferroelectric phase, display burning can be suppressed.

To achieve the first object, a method of driving an LCD device according to the ninth aspect of this invention comprises:

a liquid crystal display device preparation step of preparing a liquid crystal display device comprising a pair of substrates on whose opposing surfaces electrodes are formed; a liquid crystal, exhibiting ferroelectric phases, being placed between the pair of substrates, and having a first alignment state exhibiting a first ferroelectric phase where liquid crystal molecules are aligned substantially in a first direction in accordance with a first voltage of one polarity applied between the electrodes, a second alignment state exhibiting a second ferroelectric phase where the liquid crystal molecules are aligned substantially in a second direction in accordance with a second voltage of the other polarity applied between the electrodes, and a third alignment state where a director of the liquid crystal is directed in a third direction substantially matching with a normal-line direction of a layer of a smectic phase when no voltage is applied between the electrodes, the director of the liquid crystal is directed between the first direction and the second direction in accordance with application of an arbitrary third voltage between the first voltage and the second voltage; a pair of polarization plates, arranged so as to sandwich the pair of substrates and in such a way that an optical axis of one of the polarization plates is set in an angular range defined by either one of the first and second directions and the third direction and an optical axis of the other polarization plate is substantially perpendicular or parallel to the former optical axis; and a drive step of applying a voltage to the liquid crystal between the electrodes, the voltage causing the director of the liquid crystal to vary within an angular range narrower than an angle 2θ defined by the first and second directions.

Since the display gradation is specifically determined in accordance with the applied voltage according to this LCD device driving method, so-called DC driving can be effected, ensuring the suppression of flickering.

In this LCD driving method, the drive step may apply a voltage for causing the director of the liquid crystal to vary within a range of 45° to the liquid crystal.

The optical axis of one of the polarization plates may become substantially parallel to one of fluctuation angles of the director of the liquid crystal.

To achieve the first object, a method of driving an LCD device according to the tenth aspect of this invention comprises:

a liquid crystal display device preparation step of preparing a liquid crystal display device comprising a pair of substrates on whose opposing surfaces electrodes are formed; a liquid crystal, exhibiting ferroelectric phases, being placed between the pair of substrates, and having a first alignment state exhibiting a first ferroelectric phase where liquid crystal molecules are aligned substantially in a first direction in accordance with a first voltage of one polarity applied between the electrodes, and a second alignment state exhibiting a second ferroelectric phase where the liquid crystal molecules are aligned substantially in a second direction in accordance with a second voltage of the other polarity applied between the electrodes, a director of the liquid crystal is directed between the first direction and the second direction in accordance with application of an arbitrary third voltage between the first voltage and the second voltage; and a pair of polarization plates, arranged so as to sandwich the pair of substrates and in such a way that optical axes of the polarization plates become perpendicular or parallel to each other; and a drive step of applying a voltage to the liquid crystal between the electrodes, the voltage causing the director of the liquid crystal to vary within a range of an angle 2θ defined by the first and second directions and within such an angular range as not to set the liquid crystal in a ferroelectric phase.

Since this LCD device driving method drives the liquid crystal without setting the liquid crystal in a ferroelectric phase, display burning can be suppressed. Further, as the display gradation is specifically determined in accordance with the applied voltage, so-called DC driving can be effected, ensuring the suppression of flickering.

In this LCD driving method, the drive step may apply a pulse voltage corresponding to externally supplied image data to the liquid crystal.

To achieve the second object, a method of driving an LCD device according to the eleventh aspect of this invention comprises:

- a liquid crystal display device preparation step of preparing a liquid crystal display device comprising a pair of substrates on whose opposing surfaces electrodes are formed; a liquid crystal, exhibiting ferroelectric phases, being placed between the pair of substrates, and having a first alignment state exhibiting a first ferroelectric phase where liquid crystal molecules are aligned substantially in a first direction in accordance with a first voltage of one polarity applied between the electrodes, a second alignment state exhibiting a second ferroelectric phase where the liquid crystal molecules are aligned substantially in a second direction in accordance with a second voltage of the other polarity applied between the electrodes, and a third alignment state where director of the liquid crystal is directed in a third direction substantially matching with a normal-line direction of a layer of a smectic phase when no voltage is applied between the electrodes, the director of the liquid crystal is directed between the first direction and the second direction in accordance with application of an arbitrary third voltage between the first voltage and the second voltage; a pair of polarization plates, arranged so as to sandwich the pair of substrates and in such a way that an optical axis of one of the polarization plates is set in an angular range defined by either one of the first and second directions and the third direction and an optical axis of the other polarization plate is substantially perpendicular or parallel to the former optical axis;
- a drive step of applying a voltage to the liquid crystal between the electrodes, the voltage causing the director of the liquid crystal to vary within an angular range narrower than an angle 2θ defined by the first and second directions; and
- a contrast compensation step of controlling the voltage to be applied in the drive step to thereby compensate a control of an image to be displayed by changing the director of the liquid crystal.

According to this LCD driving method, the compensation of the contrast of an image to be displayed can allow the image to be displayed with the proper gradation even if the electro-optical characteristic of the liquid crystal changes due to a change in the temperature of the liquid crystal.

In this LCD driving method, the drive step may include:

- a first voltage applying step of applying a first voltage corresponding to a maximum gradation of the image to be displayed to the liquid crystal; and
- a second voltage applying step of applying a second voltage corresponding to a minimum gradation of the image to be displayed to the liquid crystal.

In this LCD driving method, the contrast compensation step may include:

- a temperature detection step of detecting a temperature of the liquid crystal; and
- a voltage compensation step of compensating the voltage to be applied to the liquid crystal in the drive step, in accordance with the temperature detected in the temperature detection step.

In this case, the voltage compensation step may include an applied voltage compensation step of compensating a range of a value of an applied voltage in accordance with the temperature, and an offset voltage compensation step of compensating an offset voltage in accordance with the temperature.

BRIEF DESCRIPTION OF THE DRAWINGS

FIGS. 8A through 8C are timing charts illustrating the relationships between the waveforms of voltages to be applied to pixels by another method of driving an LCD device according to the first embodiment of this invention and the transmittance;

FIG. 13A is a diagram showing the relationship between the applied voltage and the transmittance when an LCD device according to an example which uses an AFLC (2) shown on Table 1 is so driven as not to exhibit ferroelectric phases;

FIG. 13B is a diagram showing the relationship between the applied voltage and the transmittance when the LCD device according to the example which uses the AFLC (2) shown on Table 1 is so driven as to exhibit ferroelectric phases;

DETAILED DESCRIPTION OF THE PREFERRED EMBODIMENTS

Figure 1:
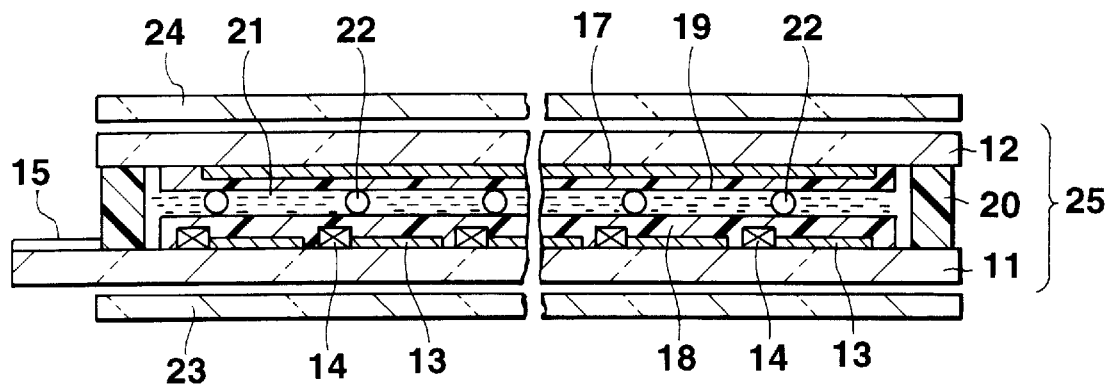
FIG. 1 is a cross-sectional view showing the structure of an LCD device according to the first embodiment of this invention.
Figure 2:
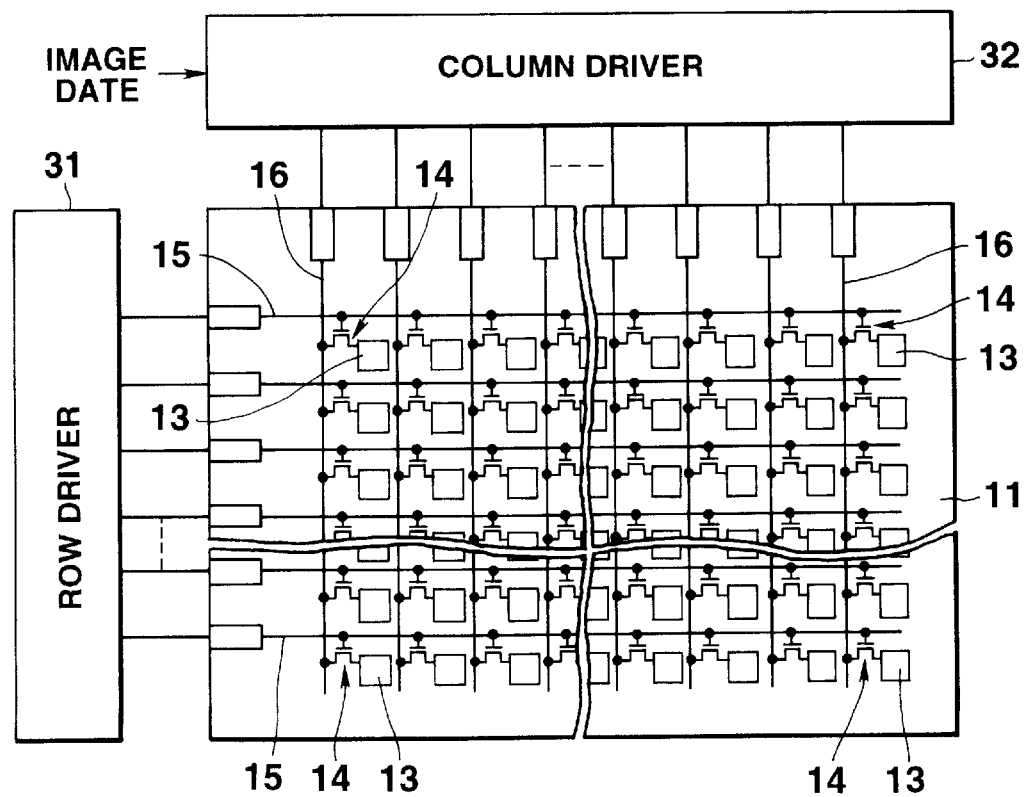
FIG. 2 is a plan view showing the structure of a lower substrate of the LCD device according to the first embodiment.

Preferred embodiments of the present invention will now be described with reference to the accompanying drawings.
First Embodiment FIG. 1 is a cross-sectional view of a display device according to the first embodiment. FIG. 2 is a plan view of a transparent substrate on which pixel electrodes and active elements are formed.

This display device is of an active matrix type, and comprises a pair of transparent substrates (e.g., glass substrates) 11 and 12, a liquid crystal 21 provided between the transparent substrates 11 and 12, and a pair of polarization plates 23 and 24 arranged to sandwich those substrates 11 and 12, as shown in FIG. 1.

In FIG. 1, transparent pixel electrodes 13 formed of a transparent conductive material like ITO (Indium Tin Oxide), and thin film transistors (TFTs) 14 having their source electrodes connected to the associated pixel electrodes 13 are arranged on the lower transparent substrate (hereinafter called lower substrate) 11 in a matrix form.

As shown in FIG. 2, gate lines (scan lines) 15 are laid between the rows of pixel electrodes 13 and data lines (gradation signal lines) 16 are laid between the columns of pixel electrodes 13. The gate electrodes of the individual TFTs 14 are connected to the associated gate lines 15, and the drain electrodes of the TFTs 14 are connected to the associated data lines 16.

Figure 3:
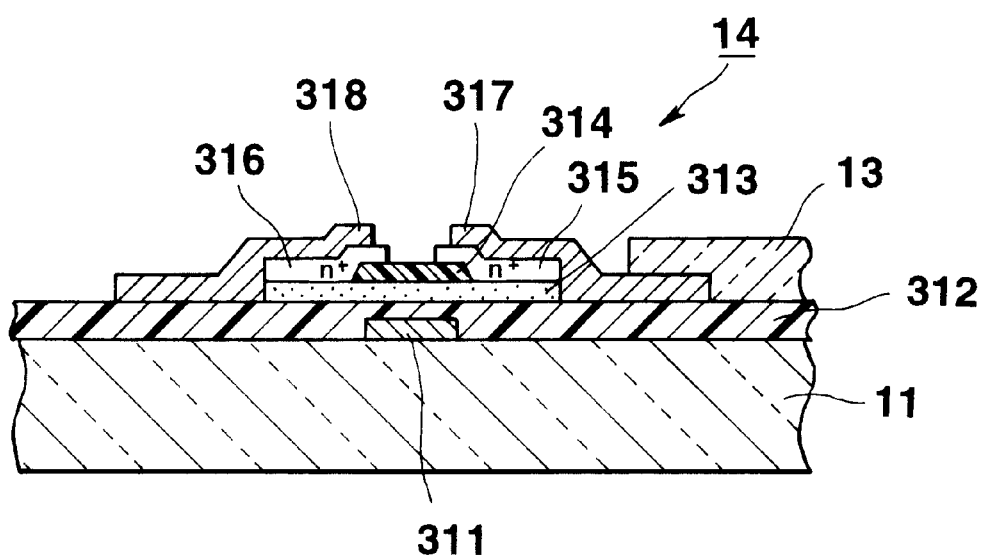
FIG. 3 is a cross-sectional view depicting the structure of a TFT of the LCD device shown in FIG. 2.

As shown in enlargement in FIG. 3, each TFT 14 has a gate electrode 311 formed on the lower substrate 11, a gate insulator film 312 covering the entire lower substrate 11, an intrinsic semiconductor layer 313 formed on the gate insulator film 312, a blocking layer 314 formed on a channel region of the intrinsic semiconductor layer 313, contact layers 315 and 316 formed on a source region and a drain region of the intrinsic semiconductor layer 313, a source electrode 317 connected to the contact layer 315, and a drain electrode 318 connected to the contact layer 316. Connected to the source electrode 317 is the associated pixel electrode 13.

The gate lines 15 are connected to a row driver 31, and the data lines 16 are connected to a column driver 32. The row driver 31 applies a gate voltage (which will be described later) to the gate lines 15 to scan the gate lines 15. The column driver 32 receives image data (gradation signal) and applies a data signal corresponding to the image data to the data lines 16.

In FIG. 1, an opposing electrode (common electrode) 17, which opposes the individual pixel electrodes 13 on the lower substrate 11 and is to be applied with a reference voltage V0, is formed on the upper transparent substrate (hereinafter called upper substrate) 12. The opposing electrode 17 is a transparent electrode made of ITO or the like.

Aligning films 18 and 19 are provided on the electrode-forming surfaces of the lower substrate 11 and the upper substrate 12. The aligning films 18 and 19 are homogeneous aligning films formed of an organic high molecular compound, such as polyimide, and having a thickness of about 25 to 35 nm. The aligning films in use have dispersion force esd of 30 to 50, and relatively weak polar force esp of about 3 to 20. At least one of the opposing surfaces of the aligning films 18 and 19 has undergone an aligning treatment, "rubbing," once in each of the opposite and parallel directions.

The lower substrate 11 and the upper substrate 12 are adhered at their peripheral edge portions via a frame-shaped seal member 20, thus forming a liquid crystal (LC) cell 25.

The gap between the aligning films 18 and 19 is regulated to a constant gap of 1.4 μm to 2.4 μm by the seal member 20 and a gap member 22. The liquid crystal 21 is sealed in an region surrounded by the substrates 11 and 12 and the seal member 20.

The molecules of the liquid crystal 21 (hereinafter called LC molecules) have a single helical structure (in the case of an FLC) or a double helical structure (in the case of an AFLC) in a bulk state. Since the gap length of the LC cell 25 is shorter than the helical pitch, the molecules of the liquid crystal 21 are sealed in the LC cell 25 with the helix broken.

The liquid crystal 21 is formed of a liquid crystal composition (FLC or AFLC) of a chiral smectic C phase or CA phase (SmC* or SmCA*) whose molecules have spontaneous polarizations Ps and have a cone angle 2θ which is twice the angle (tilt angle) defined by the axis of the cone drawn by the molecules and the cone is greater than 45° (desirably equal to or greater than 60°).

The homogeneous component (the component projected on a plane parallel to the major surfaces of the substrates 11 and 12) of the director of the liquid crystal 21 (the average aligning direction of the long axes of a plurality of LC molecules which constitute the liquid crystal) continuously varies in accordance with the applied voltage.

One example of a liquid crystal having such a property is an AFLC which is obtained by mixing liquid crystal materials (I) to (III) having skeleton structures expressed by chemical formula 1 at a ratio of 20% by weight, 40% by weight and 40% by weight.

Chemical Formula 1 ordinary AFLC. The phase transition precursor phenomenon is a phenomenon such that the transmittance of an LC element at the optical location shown in FIG. 4 rises before the occurrence of the phase transition from the antiferroelectric phase to the ferroelectric phase when the strength of an electric field to be applied to the LC molecules having the antiferroelectric phase is gradually increased. The increase in transmittance means that the LC molecules behave before phase transition. The behavior of the LC molecules before phase transition means that the potential energy barrier of the antiferroelectric phase and ferroelectric phase is small.

Such an AFLC has a layer structure and a helical structure of aligned molecules in a bulk state; adjoining LC molecules has a double helical structure with helixes drawn by the LC molecules shifted by approximately 180° on an imaginary cone layer by layer, and the spontaneous polarizations of the LC molecules in adjoining smectic layers are canceled out each other. The AFLC liquid crystal sealed between the substrates 11 and 12 has a gap between the substrates (the cell gap of the LCD device 25) of about 1.5 μ which is substantially equal to one pitch (natural pitch) of the helical structure of a liquid crystal. Therefore, the double helical structure of the LC molecules vanishes.

When an electric field is applied to the AFLC, the LC molecules of the antiferroelectric phase behaves along the imaginary cone in accordance with the strength of the electric field due to the small potential energy barrier of the antiferroelectric phase and ferroelectric phase. Accordingly, the homogeneous component of the director of the AFLC continuously varies in accordance with the applied voltage.

A description will now be given of the relationship among the direction of an aligning treatment performed on the

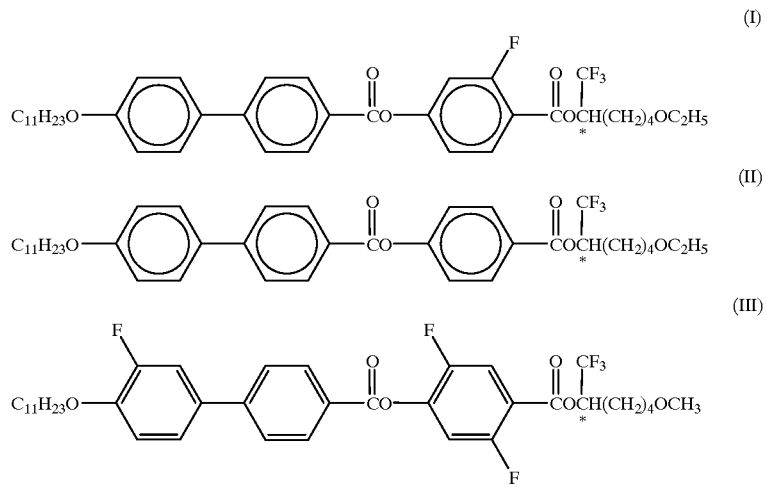

Those liquid crystal compounds are AFLC compounds having a chiral terminal chain bonded to ether and optionally a phenyl ring subjected to fluorine reduction. An LCD device using such an AFLC compound reduces the threshold value of electric field induced transition of an AFLC, which prominently shows a precursor phenomenon. As a result, the liquid crystal 21 does not have a distinctive threshold value in the electro-optical characteristic.

Figure 4:
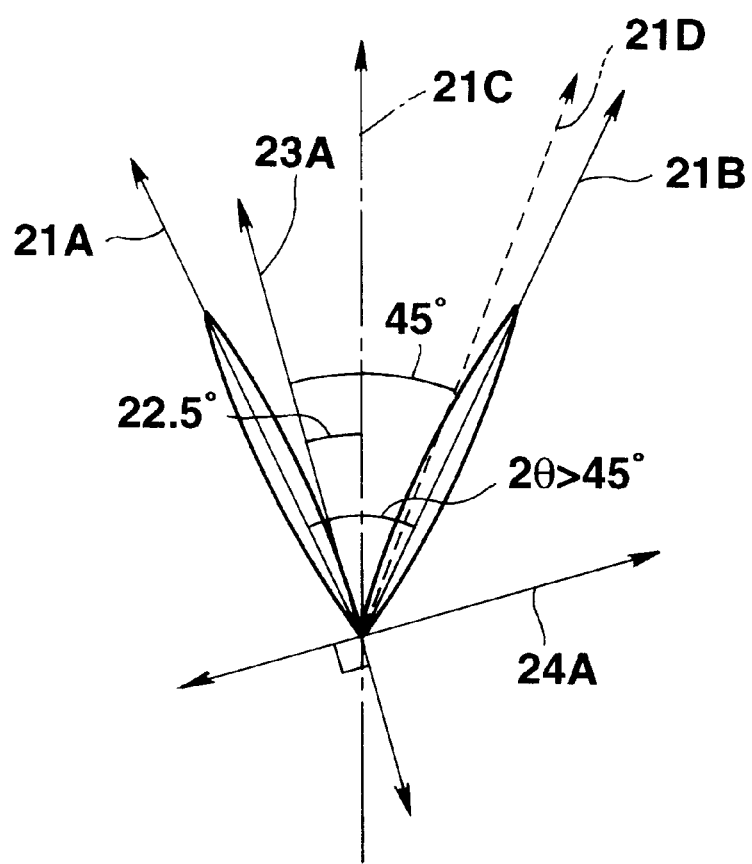
FIG. 4 is a diagram illustrating the relationship between the transmission axes of polarization plates and the aligning direction of LC molecules.

A liquid crystal having such a structure and property is characterized in that the potential energy barrier of an antiferroelectric phase and a ferroelectric phase is smaller than that of an ordinary AFLC, and the order of the ferroelectric phase is disturbed more easily with a greater phase transition precursor phenomenon, as compared with the aligning films 18 and 19, the optical axes of the polarization plates 23 and 24 and the aligning directions of the LC molecules of the liquid crystal 21, with reference to FIG. 4.

Referring to FIG. 4, a numeral "21C" indicates the direction of an aligning treatment performed on the aligning films 18 and 19. The molecules of the liquid crystal 21 are aligned with a normal line of a layer having a layer structure of a chiral smectic C phase or CA phase directed in the aligning treatment direction 21C within an error range of about ±2°.

When a voltage lower than a negative predetermined voltage −VS is applied to the liquid crystal 21, the liquid crystal 21 becomes a first alignment state (ferroelectric phase) and the aligning directions of the LC molecules become substantially a first direction 21A. When a voltage higher than a positive predetermined voltage +VS is applied to the liquid crystal 21, the liquid crystal 21 becomes a second alignment state and the aligning directions of the LC molecules become substantially a second direction 21B. When a voltage of 0 V is to be applied to the liquid crystal 21, the average aligning direction of the LC molecules become substantially normal to the layer of the smectic phase of the liquid crystal, i.e., a direction 21C substantially between the first and second directions 21A and 21B (substantially the aligning treatment direction).

The angle of deviation between the first direction 21A and the second direction 21B is equal to or greater than 45°, desirably equal to or greater than 50°, and more desirably equal to or greater than 60°.

It is desirable that the transmission axis, 23A, of the polarization plate 23 should be set within an angular range defined by the first direction 21A and the aligning treatment direction 21C and should intersect the aligning treatment direction 21C at an angle of 45°/2. According to the first embodiment, the transmission axis 23A is set in a direction of 22.5° with respect to the aligning treatment direction 21C. The transmission axis, 24A, of the polarization plate 24 is set substantially perpendicular to the transmission axis 23A of the polarization plate 23. That is, it is desirable to set the optical axis (transmission axis) of one of the polarization plates so as to intersect the normal line of the smectic layer of the liquid crystal at a half the angle of intersection of the optical axes of a pair of polarization plates.

The transmission axis 23A of the polarization plate 23 and the first direction 21A are so set as to intersect each other at a half the angle obtained by subtracting 45° from the deviation angle 2θ. In other words, it is preferable that when the deviation angle 2θ is equal to or greater than 50°, the transmission axis 23A of the polarization plate 23 and the first direction 21A should be set to intersect each other at an angle equal to or greater than 2.5°, and when the deviation angle 2θ is equal to or greater than 60°, the transmission axis 23A of the polarization plate 23 and the first direction 21A should be set to intersect each other at an angle equal to or greater than 7.5°.

The LCD device having the transmission axes 23A and 24A of the polarization plates 23 and 24 set as shown in FIG. 4 provides the lowest transmittance (the darkest display) when the average aligning direction of the LC molecules are set parallel to the transmission axis 23A of the polarization plate 23, and provides the highest transmittance (the brightest display) when the average aligning direction of the LC molecules are set in a direction 21D inclined by 45° to the transmission axis 23A of the polarization plate 23.

With the average aligning direction of the LC molecules set in the direction of the transmission axis 23A, the linearly polarized light which has passed the incident-side polarization plate 23 is hardly affected by the polarization effect of the liquid crystal 21 and passes the layer of the liquid crystal 21 as the linearly polarized light. The linearly polarized light which has passed the layer of the liquid crystal 21 is absorbed by the polarization plate 24 whose transmission axis 24A is set perpendicular to the polarization direction. The display therefore becomes darker.

With the average aligning direction of the LC molecules set in the direction 21D inclined by 45° to the transmission axis 23A, the polarization state of the linearly polarized light which has passed the incident-side polarization plate 23 is changed (circularly polarized or elliptically polarized) by the birifringence effect of the liquid crystal 21. Of the polarized light, the component parallel to the transmission axis 24A of the outgoing-side polarization plate 24 passes through the polarization plate 24. The display therefore becomes brightest.

In other alignment states, the polarized light is changed in accordance with the average aligning direction of the LC molecules by the birifringence effect matching each alignment state. Of the polarized light, the component parallel to the transmission axis 24A of the outgoing-side polarization plate 24 passes through the polarization plate 24. Therefore, the display shows the brightness that matches with the alignment state of the LC molecules.

Figure 5:
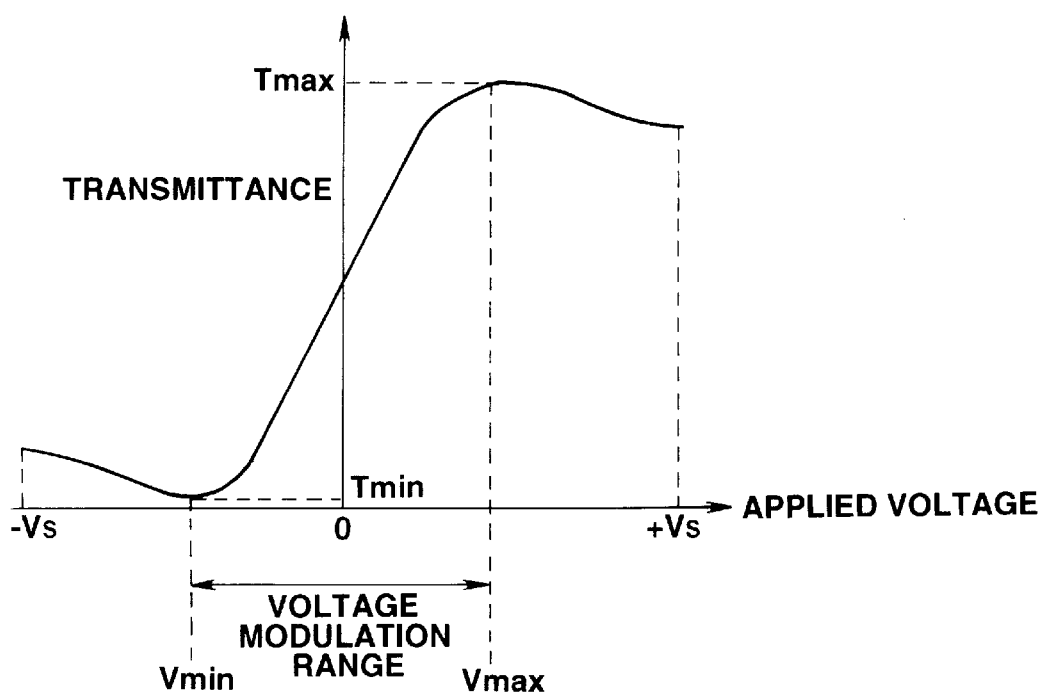
FIG. 5 is a diagram showing the relationship between the applied voltage to the liquid crystal and the transmittance.

The LC molecules change their aligning directions in accordance with a voltage to be applied between the pixel electrodes 13 and the opposing electrode 17. As shown in FIG. 5, therefore, the transmittance of this LCD device continuously changes when a sawtooth-like voltage of a relatively low frequency (about 0.1 Hz) is applied between the pixel electrodes 13 and the opposing electrode 17.

Since this LCD device is of an active matrix type, a voltage which keeps the liquid crystal 21 in any alignment state can be held even during a non-selection period. This LCD device can therefore ensure gradation display by changing the transmittance.

The transmittance of this LCD device becomes minimum when the director of the liquid crystal 21 is parallel to the transmission axis 23A of the polarization plate 23, and becomes maximum when that director intersects the transmission axis 23A at 45°. If this LCD device is used in an alignment state where the transmittance shows Tmin and Tmax, the liquid crystal 21 can be driven without being aligned in the first or second alignment state. The first and second alignment states are the states of a ferroelectric phase where all the molecules in the layer of the liquid crystal 21 are completely aligned in the same direction. In the state where the LC molecules show a ferroelectric phase, charges produced by the spontaneous polarization are apt to be held on the inner surfaces of the substrates 11 and 12. This makes the inversion of the LC molecules difficult, which makes it easier to cause burning.

In an alignment state where the LC molecules are not completely aligned and do not exhibit a ferroelectric phase, however, it is difficult for the charges produced by the spontaneous polarization to be held on the inner surfaces of the substrates 11 and 12. The inversion of the LC molecules easily occurs with the unaligned molecules as the core, thus reducing burning. In other words, by changing the drive voltage to be applied between the pixel electrodes 13 and the opposing electrode 17 within the range from VTmax to VTmin, the liquid crystal 21 can be driven without setting a ferroelectric phase, thus allowing the LCD device to display continuous gradation.

A method of driving an LCD device having the above-described structure will be discussed below with reference to FIGS. 6A through 6C.

Figure 6A:
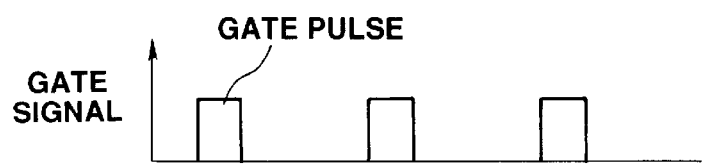
FIGS. 6A through 6C are timing charts illustrating the relationships between the waveforms of voltages to be applied to pixels by a method of driving an LCD device according to the first embodiment of this invention and the transmittance.
Figure 6B:
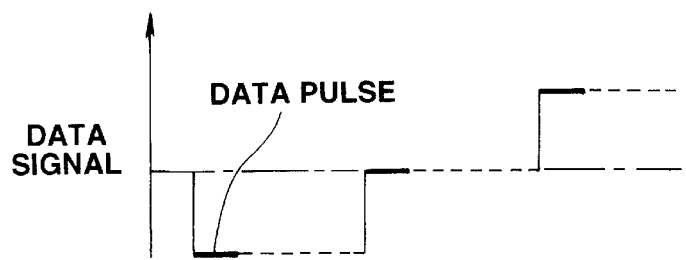

FIG. 6A shows a gate signal to be applied to an arbitrary gate line 15 by the row driver 31, and FIG. 6B shows a data signal to be applied to each data line 16 by the column driver 32 in synchronism with the gate signal. The voltage of the data pulse is set to a voltage which does not set the liquid crystal 21 in a ferroelectric phase, or a voltage lying between VTmax and VTmin, and corresponds to a desired transmittance. FIG. 6C shows the transmittance of the LCD device for a pixel when the voltage of the data pulse shown in FIG. 6B is applied to the associated pixel electrode 13.

When the gate pulse is enabled, the TFTs 14 in the selected row are turned on. A data signal corresponding to the display gradation and applied to each data line 16 by the column driver 32 is applied between the pixel electrodes 13 and the opposing electrode 17 via the enabled TFTs 14. When the gate pulse is disabled, the associated TFTs 14 are turned off. When the TFTs 14 are turned off, the voltage applied between the pixel electrodes 13 and the opposing electrode 17 is held in a pixel capacitor which is formed by the pixel electrodes 13, the opposing electrode 17 and the liquid crystal 21 located therebetween. Therefore, the display gradation corresponding to this held voltage is kept until the next selection period for this row as shown in FIG. 6C. This driving method can therefore cause the LCD device with the above-described structure to display an image of any gradation by controlling the voltage of the data pulse.

An example of the structure of the column driver 32 which drives the LCD device by the driving method illustrated in FIGS. 6A–6C will now be discussed referring to FIG. 7.

Figure 7:
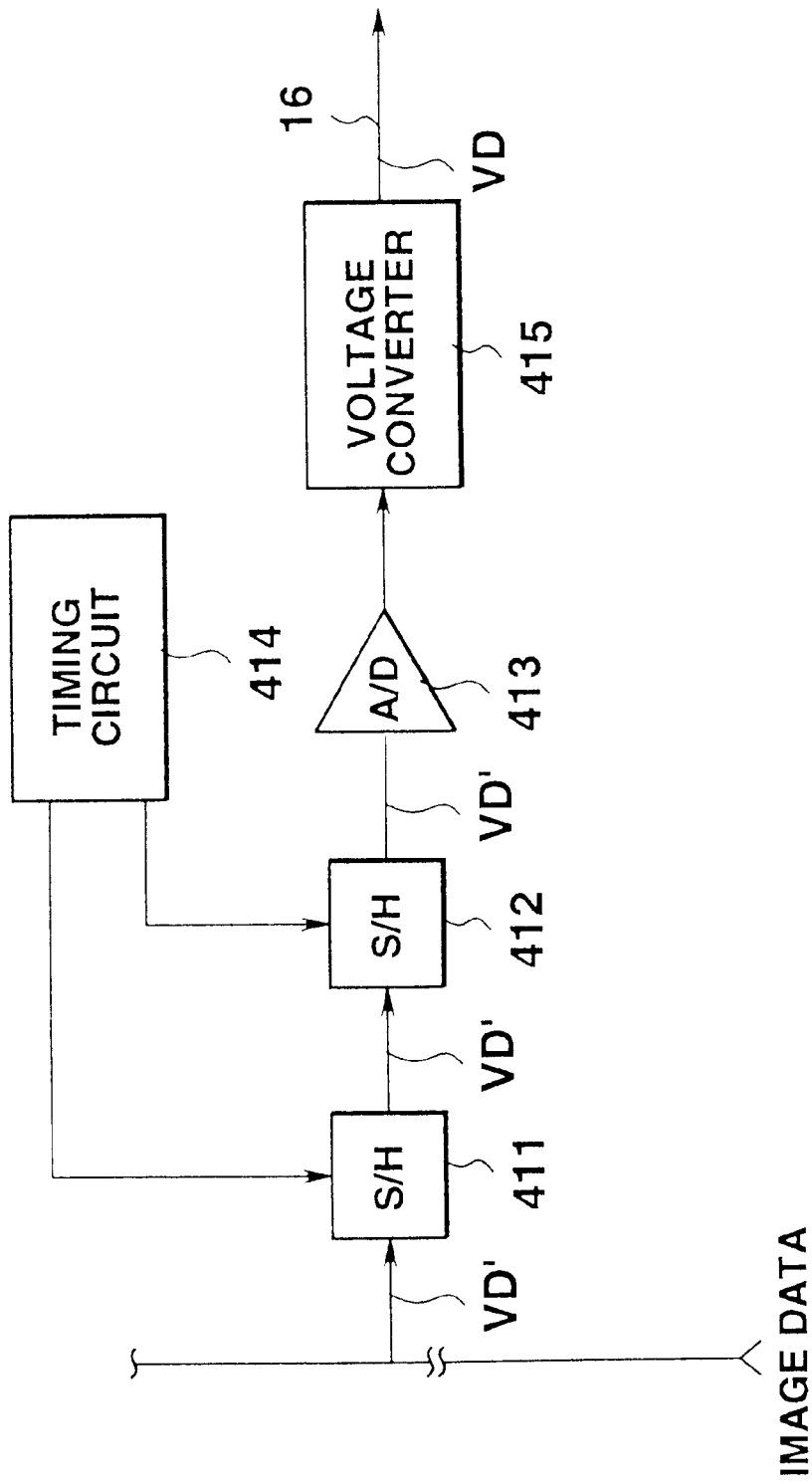
FIG. 7 is a block diagram depicting the circuit structure of a column driver for accomplishing the driving method, shown in FIGS. 6A–6C, according to the first embodiment.

The column driver 32 which accomplishes this driving method comprises a first sample and hold circuit 411, a second sample and hold circuit 412, an A/D (Analog/Digital) converter 413, a timing circuit 414 and a voltage converter 415, as shown in FIG. 7.

The first sample and hold circuit 411 samples and holds a signal component (one image data) VD' for an associated pixel in externally supplied image data. The second sample and hold circuit 412 samples and holds a hold signal VD' output from the first sample and hold circuit 411.

The A/D converter 413 performs A/D conversion on the hold signal VD' output from the second sample and hold circuit 412 to yield digital gradation data.

The timing circuit 414 supplies a timing control signal indicating the sampling and holding operation to the first and second sample and hold circuits 411 and 412 in the selection period for each row.

The voltage converter 415 converts the digital gradation data output from the A/D converter 413 to a data pulse having the associated voltage (the voltage for the drive system which is necessary to display the gradation indicated by the digital gradation data) VD, and sends the data pulse to the associated data line 16. This voltage converter 415 separates the power supply system in the signal processing system from the power supply system in the drive system. The output voltage VD of the voltage converter 415 is written in the pixel electrodes 13 to be applied to the liquid crystal 21 during the write period in which the TFTs 14 in the associated row are on. While the TFTs 14 are set off, the output voltage VD is held between the pixel electrodes 13 and the opposing electrode 17.

The first sample and hold circuit 411, the second sample and hold circuit 412, the A/D converter 413 and the voltage converter 415 are arranged for each column of pixels, and the timing circuit 414 is provided in common to a plurality of columns.

Figure 6C:
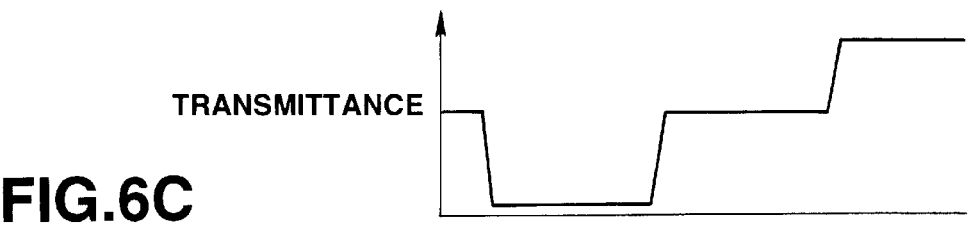

The structure of the column driver 32 which drive the LCD device by the driving method illustrated in FIGS. 6A–6C is not limited to the one shown in FIG. 7. For example, a sample and hold circuit incorporated in the A/D converter 413 may be used as the second sample and hold circuit 412. After some processing is performed on the output data of the A/D converter 413, the processed data may be supplied to the voltage converter 415 to be converted to a voltage for the drive system. The processed data may be temporarily converted to a gradation signal having a voltage for the signal processing system before being converted to a voltage for the drive system by the voltage converter. Various kinds of timing signals may be externally supplied to the column driver 32. Image data itself may be formed of digital data.

When the liquid crystal 21 has a large hysteresis in the electro-optical characteristic shown in FIG. 5, the driving method shown in FIGS. 6A–6C does not permit the display gradation corresponding to the voltage of the data pulse to be specifically determined. In such a case, another driving method as illustrated in, for example, FIGS. 8A through 8C, should be employed.

FIG. 8A shows a gate signal to be applied to an arbitrary gate line 15 by the row driver 31, and FIG. 8B shows a data signal to be applied to each data line 16 by the column driver 32 in synchronism with the gate signal. FIG. 8C shows the transmittance of the LCD device for a pixel when the voltage of the data signal shown in FIG. 8B is applied to the associated pixel electrode 13.

As the gate pulse is enabled during a selection period Ts, the TFTs 14 in the selected row are turned on. A data pulse applied to each data line 16 by the column driver 32 is applied between the pixel electrodes 13 and the opposing electrode 17 via the enabled TFTs 14. The data pulse consists of a set pulse VH applied in a time slot $t_1$ for causing the LC molecules to be aligned in a predetermined alignment state, a reset pulse VL applied in a time slot $t_2$ for canceling the DC component of this set pulse, and a gradation pulse VD applied in a time slot $t_3$ and corresponding to the display gradation.

When the gate pulse is disabled, the associated TFTs 14 are turned off. When the TFTs 14 are turned off, the voltage of the gradation pulse VD which has been applied between the pixel electrodes 13 and the opposing electrode 17 is held in a pixel capacitor which is formed by the pixel electrodes 13, the opposing electrode 17 and the liquid crystal 21 located therebetween. As shown in FIG. 8C, therefore, the display gradation corresponding to this held voltage is kept until the next selection period for this row. This driving method can therefore cause the LCD device with the above-described structure to display an image of any gradation by controlling the voltage of the data pulse. What is more, the application of the reset pulse VL can cancels out the unnecessary DC component to be applied to the liquid crystal 21. This relieves the storage of charges in the inner surfaces of the substrates 11 and 12, which makes the inversion of the LC molecules easier, and thus suppresses display burning.

An example of the structure of the column driver 32 which drives the LCD device by the driving method illustrated in FIGS. 8A–8C will now be discussed referring to FIG. 9.

Figure 9:
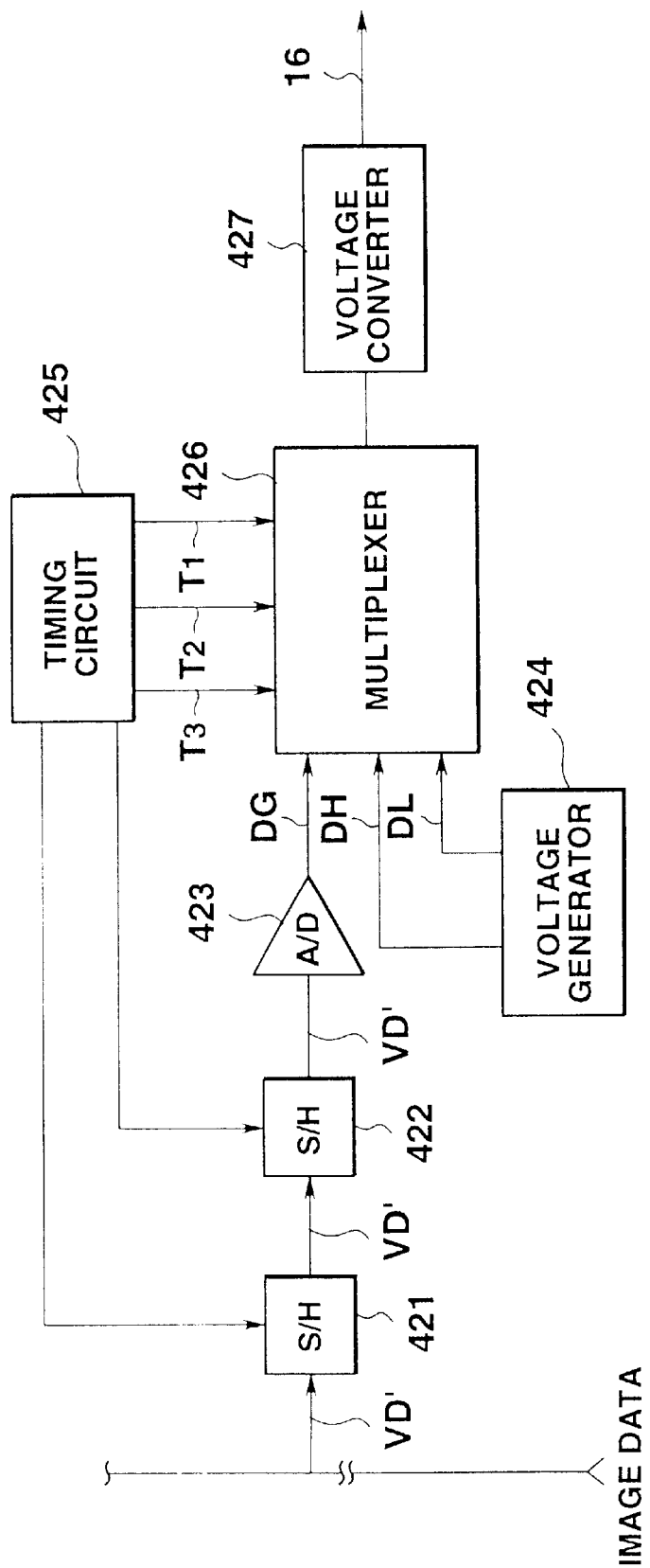
FIG. 9 is a block diagram depicting the circuit structure of a column driver for accomplishing the driving method, shown in FIGS. 8A–8C, according to the first embodiment.

The column driver 32 which accomplishes this driving method comprises a first sample and hold circuit 421, a second sample and hold circuit 422, an A/D converter 423, a voltage data generator 424, a timing circuit 425, a multiplexer 426 and a voltage converter 427, as shown in FIG. 9.

The first sample and hold circuit 421 samples and holds a signal component (one image data) VD' for an associated pixel in externally supplied image data. The second sample and hold circuit 422 samples and holds a hold signal VD' output from the first sample and hold circuit 421.

The A/D converter 423 performs A/D conversion on the hold signal VD' output from the second sample and hold circuit 422 to yield digital gradation data DG.

The voltage data generator 424 generates set pulse data DH corresponding to the set pulse VH and reset pulse data DL corresponding to the reset pulse VL.

The timing circuit 425 supplies a timing control signal to the first and second sample and hold circuits 421 and 422 and enables timing signals T1, T2 and T3 respectively in time slots $t_1$, $t_2$ and $t_3$ which constitutes the selection period (the period when the gate pulse is enabled) TS for each row.

The multiplexer 426 selectively outputs the reset pulse data DL, the set pulse data DH and the digital gradation data DG from the A/D converter 423 in each selection period TS in response to the timing signals T1–T3 in order.

The voltage converter 427 converts the output data of the multiplexer 426 to a high voltage for the drive system and sends the voltage to the associated data line 16. Specifically, the voltage converter 427 converts the reset pulse data to the reset pulse VL, the set pulse data to the set pulse VH and the digital gradation data to the write voltage VD for displaying gradation indicated by the image data, and sends the pulses and voltage to the associated data line 16. This voltage converter 427 separates the power supply system in the signal processing system from the power supply system in the drive system. The drive voltages VL, VH and VD output from the voltage converter 427 are written in the associated pixel electrodes 13 to be applied to the liquid crystal 21 in the respective time slots $t_1$, $t_2$ and $t_3$ in the write period in which the TFTs 14 in the associated row are on. While the TFTs 14 are turned off, the write voltage VD applied at the timing $t_3$ is held between the pixel electrodes 13 and the opposing electrode 17.

The first sample and hold circuit 421, the second sample and hold circuit 422, the multiplexer 426 and the voltage converter 427 are arranged for each column of pixels, and the timing circuit 425 and the voltage data generator 424 are commonly provided for a plurality of columns.

The structure of the column driver 32 which drive the LCD device by the driving method illustrated in FIGS. 8A–8C is not limited to the one shown in FIG. 9. For example, a sample and hold circuit incorporated in the A/D converter 423 may be used as the second sample and hold circuit 422. After some processing is performed on the output data of the A/D converter 423, the processed data may be supplied to the multiplexer 426. The output data of the multiplexer 426 may be temporarily converted to a gradation signal having a voltage for the signal processing system before being converted to a voltage for the drive system by the voltage converter. Various kinds of timing signals may be externally supplied to the column driver 32. Image data itself may be formed of digital data.

Although the reset pulse VL and the set pulse VH are equal in absolute value to each other but of the opposite polarities in the LCD device driving method illustrated in FIGS. 8A–8C, the reset pulse VL may be set to a voltage which is equal to, but of the opposite polarity, the sum of the voltages of the set pulse VH and the gradation pulse VD. VL may be the set pulse, and VH may be the reset pulse. Although the reset pulse VL, set pulse VH and write pulse VD are sequentially applied in the write period TS in which the individual TFTs 14 are on, only the set pulse VH and the write pulse VD may be applied. The first to third time slots $t_1$–$t_3$ need not be of the same length, but may have different lengths.

Even when there is a large hysteresis in the electro-optical characteristic of the liquid crystal 21, the display gradation corresponding to the voltage of the data pulse can be specifically determined by the driving method shown in FIGS. 8A–8C. When only an image with the maximum (bright) or minimum (dark) gradation is kept displayed for a long period of time, however, display burning may be caused by the DC component of the image signal corresponding to the data pulse. When the reset pulse VL is set to a voltage which is equal to, but of the opposite polarity, the sum of the voltages of the set pulse VH and the gradation pulse VD, the voltage of the reset pulse may become too large so that the liquid crystal 21 exhibits a ferroelectric phase.

Figure 10A:
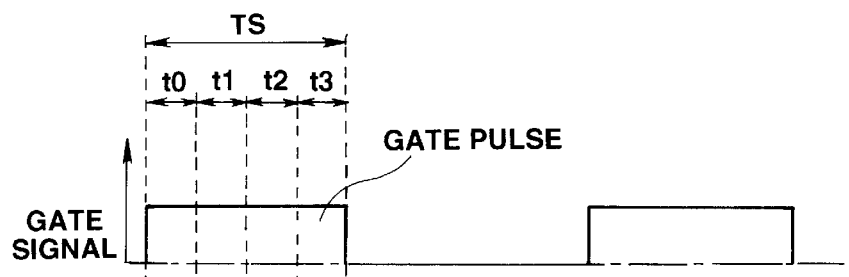
FIGS. 10A through 10C are timing charts illustrating the relationships between the waveforms of voltages to be applied to pixels by a further method of driving an LCD device according to the first embodiment of this invention and the transmittance.
Figure 10B:
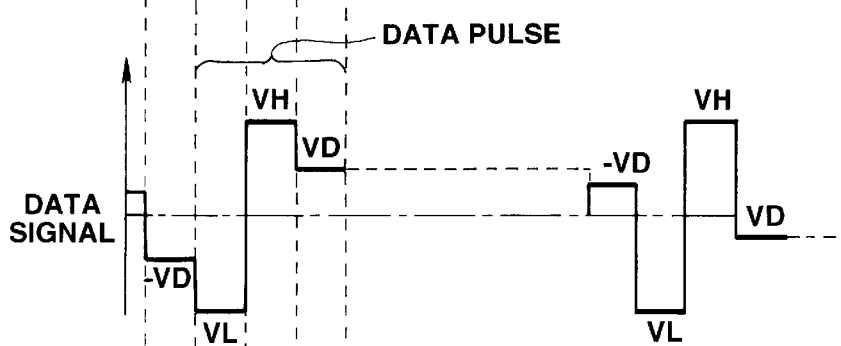
Figure 10C:
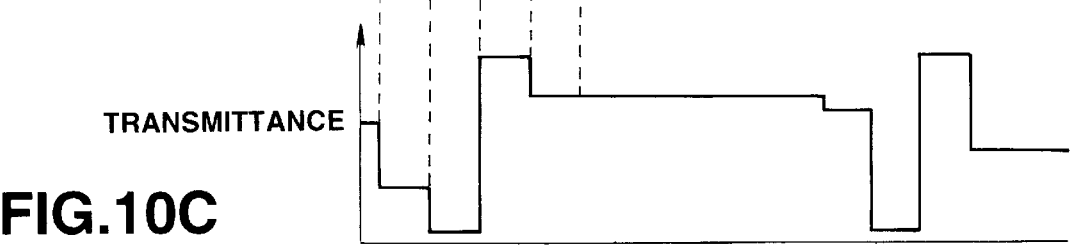

To cope with such shortcomings, a compensation pulse −VD whose voltage is equal in absolute value to the voltage of the write pulse VD but of the opposite polarity should be applied in a time slot $t_0$ prior to the application of the reset pulse VL, as shown in FIGS. 10A through 10C. In this 4-pulse driving method, the application order of the reset pulse VL and the compensation pulse −VD may be reversed.

Figure 11:
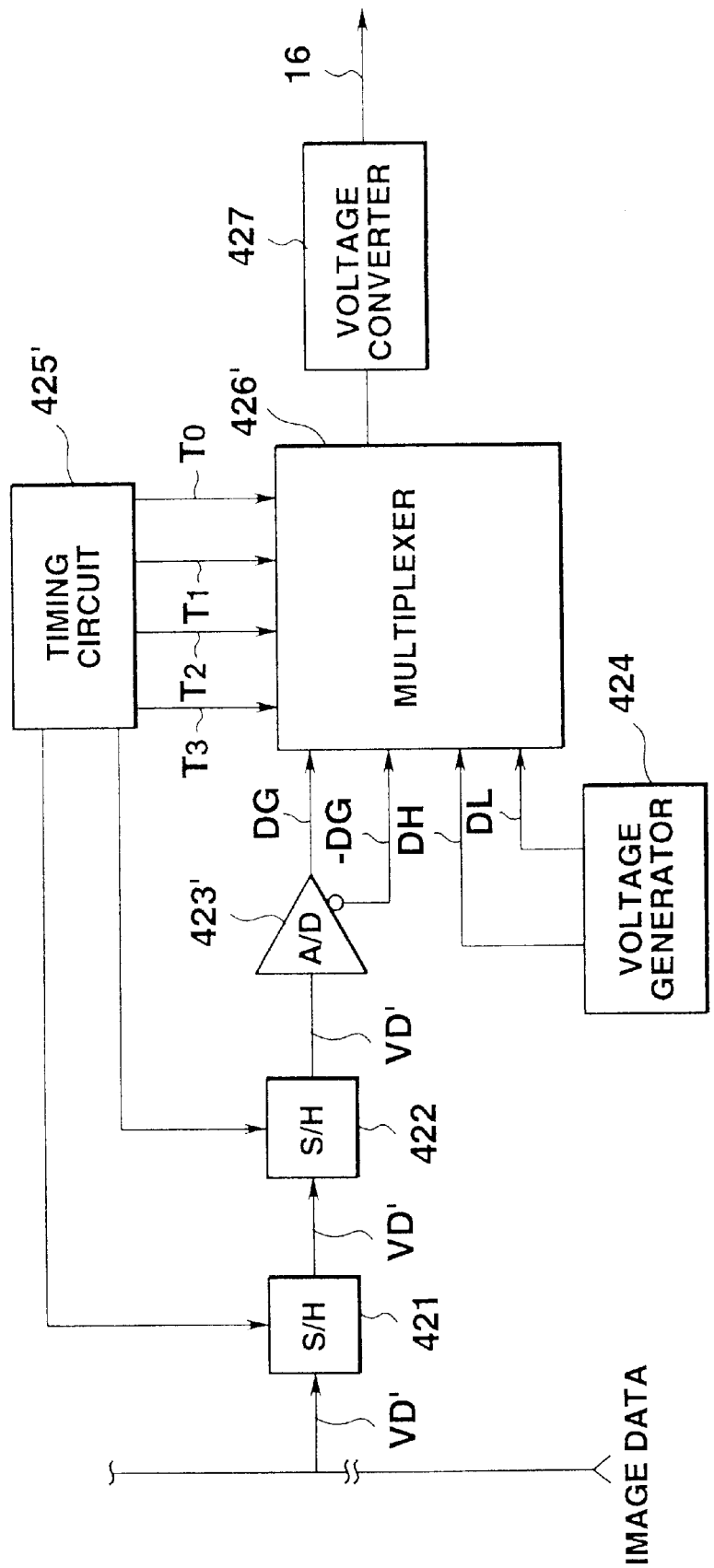
FIG. 11 is a block diagram depicting the circuit structure of a column driver for accomplishing the driving method, shown in FIGS. 10A–10C, according to the first embodiment.

An example of the structure of the column driver 32 which drives the LCD device by the driving method illustrated in FIGS. 10A–10C will now be discussed referring to FIG. 11.

The column driver 32 which accomplishes this driving method differs from the column driver 32 shown in FIG. 9 in the structures of an A/D converter 423', a voltage data generator 424', a timing circuit 425' and a multiplexer 426'.

The A/D converter 423' performs A/D conversion on the hold signal VD' output from the second sample and hold circuit 422 to yield digital gradation data DG. Further, the A/D converter 423' outputs compensation data −DG which is equal in absolute value to, but of the opposite polarity, the digital gradation data DG.

The timing circuit 425' supplies a timing control signal to the first and second sample and hold circuits 421 and 422 and enables timing signals T0, T1, T2 and T3 respectively in four time slots to, $t_0$, $t_1$, $t_2$ and $t_3$ which constitutes the selection period (the period when the gate pulse is enabled) TS for each row.

The multiplexer 426' sequentially selects and outputs the compensation data DG from the A/D converter 423', the reset pulse data DL, the set pulse data DH and the digital gradation data DG from the A/D converter 423' in each selection period TS in response to the timing signals T1–T3.

According to the above-described LCD devices and the driving method illustrated in FIGS. 6A–6C, FIGS. 8A–8C or FIGS. 10A–10C, an image with arbitrary gradation can be displayed without setting the liquid crystal 21 in a ferroelectric phase by continuously changing the gradation.

In the ferroelectric phase, the directions of the spontaneous polarizations PS of the LC molecules are matched each other, so that display burning is likely to occur. According to the LCD device driving method of the first embodiment, the spontaneous polarizations PS are not completely matched each other. Therefore, display burning does not easily occur and a high-grade image can be displayed.

Since the LCD device according to the first embodiment uses a liquid crystal of a chiral smectic phase having spontaneous polarization SP is used as the liquid crystal 21, the response speed is fast and the angle of visibility is wide.

The LCD device of the first embodiment can be driven by a DC voltage. According to the LCD device of this embodiment, a single voltage is applied for a single gradation unlike in the case of AC driving where two voltages of different polarities are applied for a single gradation. This can suppress the occurrence of flickering.

When the LCD device of the first embodiment is driven by the driving method illustrated in FIGS. 8A–8C or FIGS. 10A–10C, the molecules of the liquid crystal 21 are aligned substantially in a constant state by the set pulse VH which is applied in the time slot $t_2$. Even when there is a hysteresis in the electro-optical characteristic of the liquid crystal 21, the display gradation corresponding to the gradation pulse VD can be determined specifically. When the LCD device is driven by the driving method illustrated in FIGS. 10A–10C, in particular, the DC component of the gradation pulse can also be canceled. Even in the case where a bright image or a dark image is kept displayed, therefore, display burning can be prevented.

The LCD device according to the first embodiment is not limited to the above-described structures, but may be modified in various other forms.

For example, it is possible to set a liquid crystal not in a ferroelectric phase even when the liquid crystal is driven within an angular range smaller than the maximum angular range where the director of the liquid crystal is changed by the electric field. As long as the liquid crystal is driven without setting a ferroelectric phase, the driving can be accomplished within the angular range where the fluctuation angle of the director of the liquid crystal does not reach 45°. In this case, however, the maximum transmittance and the minimum transmittance cannot be obtained. To acquire the maximum contrast, it is preferable that the liquid crystal should be driven with the fluctuation angle of 45° in the range that does not provide a ferroelectric phase. When the liquid crystal is driven so as not to be set in the ferroelectric phase with the director of the liquid crystal set within the angular range of 45°, the transmission axis of one of the polarization plates can be set in any direction, excluding the direction of the director which provides a ferroelectric phase within the range of the deviation angle 2θ of the liquid crystal which is greater than 45°. When the deviation angle 2θ of the liquid crystal is set equal to or greater than 60°, for example, the transmission axis 23A of the polarization plate 23 may be set at the position of 12.5° from the first direction 21A, the transmission axis 24A of the polarization plate 24 may be set perpendicular or parallel to the transmission axis 23A, and the liquid crystal 21 may be driven with its director lying between the direction of the transmission axis 23A and a direction inclined by 45° to that direction.

Further, a liquid crystal having a deviation angle 2θ of 90° or greater may be used. In this case, for example, the transmission axis 23A of the polarization plate 23 may be set normal to the smectic layer while setting the transmission axis 24A of the polarization plate 24 perpendicular or parallel to the transmission axis 23A.

Although the liquid crystal 21 is sealed in the LC cell 25 with its helical structure broken in the first embodiment, the liquid crystal 21 may be sealed in the LC cell 25 with the helical structure. In this case, a liquid crystal having the basic structure as indicated by the chemical formula 1 can be used.

A DHF liquid crystal having a cone angle 2θ of 45° or greater may be used as the liquid crystal 21. In this case, the DHF liquid crystal, whose helical pitch is sufficiently smaller than the gap between the substrates and which has spontaneous polarization and shows a ferroelectric phase, is sealed between the substrates 11 and 12 with the helical structure of the LC molecules maintained.

When a voltage of one polarity whose absolute value is equal to or greater than a predetermined value is applied, the DHF liquid crystal becomes a first ferroelectric phase where the helix is broken, and the LC molecules are aligned substantially in the first direction 21A shown in FIG. 4. When a voltage of the other polarity whose absolute value is equal to or greater than a predetermined value is applied, the DHF liquid crystal becomes a second ferroelectric phase where the helix is broken, and the LC molecules are aligned substantially in the second direction 21B shown in FIG. 4.

When an intermediate voltage is applied, the helical structure drawn by the LC molecules is deformed in accordance with the applied voltage to set an intermediate alignment state in which the average direction of the long-axis directions of the LC molecules becomes any direction between the first direction 21A and the second direction 21B.

Therefore, the transmittance of even an LCD device using a DHF liquid crystal changes as shown in FIG. 5 if a pair of polarization plates are arranged as shown in FIG. 4 and the applied voltage is changed.

Even in the case of using a DHF liquid crystal as the liquid crystal 21, therefore, it is possible to prevent display burning or the like and provide the maximum gradation width by controlling the applied voltage between VTmin and VTmax and adjusting the director of the liquid crystal 21 between the direction of the transmission axis 23A and the direction 21D inclined by 45° to the transmission axis 23A in such a manner that the liquid crystal 21 does not exhibit a ferroelectric phase.

According to the LCD device embodying this invention, the transmission axis 24A of the polarization plate 24 and the transmission axis 23A of the polarization plate 23 may be set parallel to each other. In this case, the bright and dark gradations of an image to be displayed are reversed. The absorption axes of the polarization plates 23 and 24 may be used instead of the transmission axes.

Specific examples of the LCD device according to the first embodiment and the method of driving the same will now be described.

(EXAMPLE 1-1)

Three kinds of AFLCs (1) to (3) having the properties as given on Table 1 were prepared with the liquid crystals shown by (I) to (III) in the chemical formula 1 as the basic compositions.

TABLE 1

| LC numbers | (1) | (2) | (3) |
|---|---|---|---|
| Cone angle (2θ) [°] | 60 | 50 | 45 |
| ISO-SA transition temperature [° C.] | 85 | 85.5 | 84 |
| SA-SCA* transition temperature [° C.] | 70 | 60 | 60 |
| PS [nc/cm$^2$] | 250 | 150 | 130 |
| Tilt angle (θ) [°] | 30 | 25 | 22.5 |

The spontanious polarization (PS) and the tilt angle were measured at the temperature of 25° C.

Then, LCD devices which had the structure as shown in FIGS. 1–4 and respectively used those AFLCs (1) to (3) were fabricated. The electro-optical characteristics of those LCD devices were measured as the LCD devices were driven by the driving methods which will be discussed below.

In this experiment, the polarization plate 23 of the LCD device was arranged with its transmission axis 23A inclined by 22.5° to the line normal to the layer having a layer structure of a smectic phase (smectic layer), while the transmission axis 24A of the other polarization plate 24 was set perpendicular to the transmission axis 23A of the polarization plate 23.

For the Example 1-1, the electro-optical characteristic of the LCD device was measured as the LCD device was driven as follows.

1. When the liquid crystal is so driven as to exhibit a ferroelectric phase, pulse voltages varying from +20 V to −20 V by 0.5 V were sequentially applied between the pixel electrodes 13 and the opposing electrode 17 each for about 30 seconds, and the transmittance for each pulse voltage was measured. When the liquid crystal is so driven as not to exhibit a ferroelectric phase, pulse voltages varying from +5 V to −5 V by 0.5 V were sequentially applied between the pixel electrodes 13 and the opposing electrode 17 each for about 30 seconds, and the transmittance for each pulse voltage was measured.
(First driving)

2. Thereafter, when the liquid crystal is so driven as to exhibit a ferroelectric phase, +20 V was kept applied between the pixel electrodes 13 and the opposing electrode 17 each for about 30 minutes. When the liquid crystal is so driven as not to exhibit a ferroelectric phase, +5 V was kept applied between the pixel electrodes 13 and the opposing electrode 17 each for about 30 minutes.

3. The LCD device was driven by the same driving method as used in the first driving and the transmittance was measured for each pulse voltage. (Second driving) FIGS. 12A through 14B show the transmittances of the LCD devices obtained in the first driving and the second driving by the above driving method.

Figures 12A, 12B:
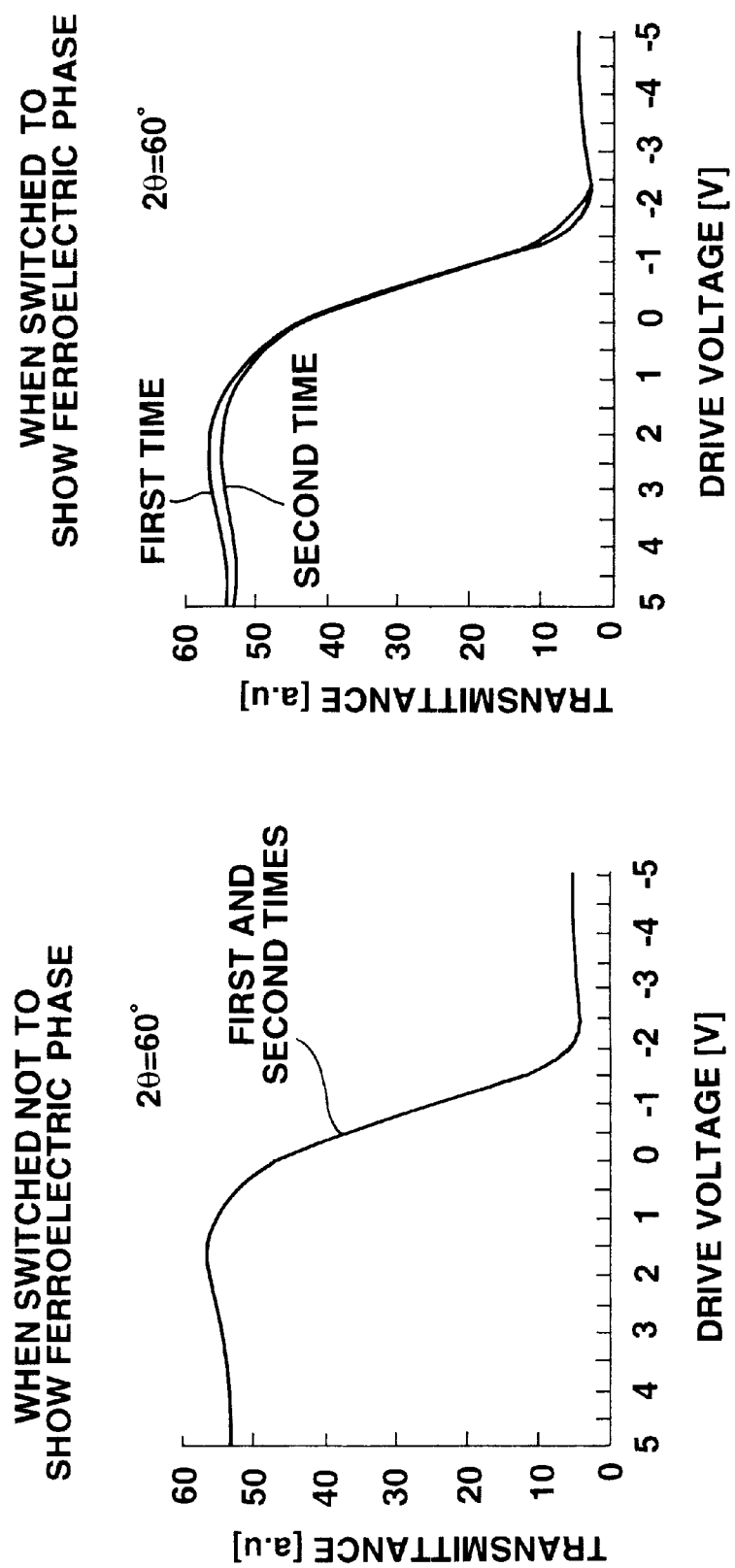
FIG. 12A is a diagram showing the relationship between the applied voltage and the transmittance when an LCD device according to an example which uses an AFLC (1) shown on Table 1 is so driven as not to exhibit ferroelectric phases.
FIG. 12B is a diagram showing the relationship between the applied voltage and the transmittance when the LCD device according to the example which uses the AFLC (1) shown on Table 1 is so driven as to exhibit ferroelectric phases.

FIG. 12A shows the relationship between the applied voltage and the transmittance when the LCD device using the AFLC (1) as the liquid crystal 21 is driven in such a way that the liquid crystal does not exhibit a ferroelectric phase. FIG. 12B shows the relationship between the applied voltage and the transmittance when the LCD device using the AFLC (1) is driven in such a way that the liquid crystal exhibits a ferroelectric phase. FIG. 12B shows the electro-optical characteristic of the LCD device in the same voltage range as in FIG. 12A.

FIG. 13A shows the relationship between the applied voltage and the transmittance when the LCD device using the AFLC (2) as the liquid crystal 21 is driven in such a way that the liquid crystal does not exhibit a ferroelectric phase. FIG. 13B shows the relationship between the applied voltage and the transmittance when the LCD device using the AFLC (2) is driven in such a way that the liquid crystal exhibits a ferroelectric phase. FIG. 13B shows the electro-optical characteristic of the LCD device in the same voltage range as in FIG. 13A.

Figures 14A, 14B:
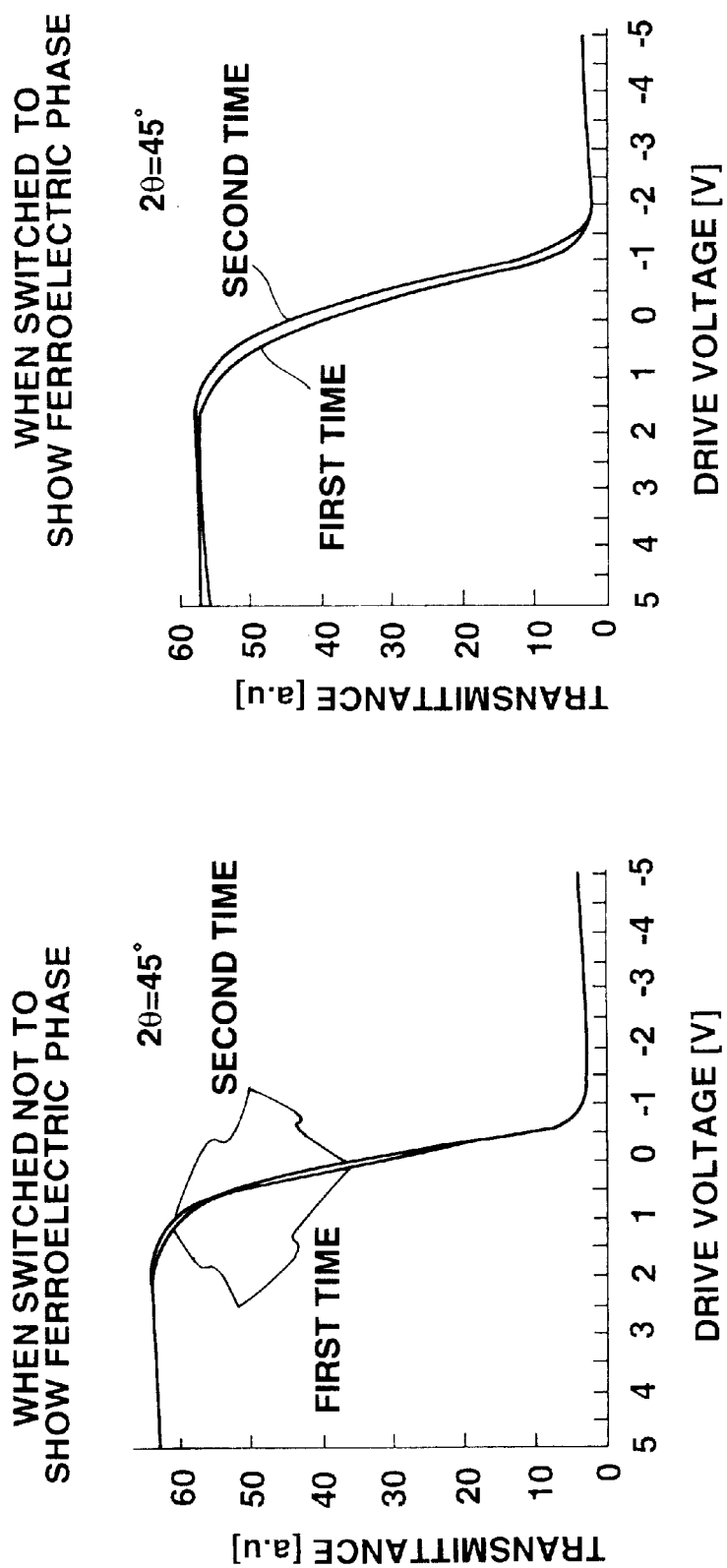
FIG. 14A is a diagram showing the relationship between the applied voltage and the transmittance when an LCD device according to an example which uses an AFLC (3) shown on Table 1 is so driven as not to exhibit ferroelectric phases.
FIG. 14B is a diagram showing the relationship between the applied voltage and the transmittance when the LCD device according to the example which uses the AFLC (3) shown on Table 1 is so driven as to exhibit ferroelectric phases.

FIG. 14A shows the relationship between the applied voltage and the transmittance when the LCD device using the AFLC (3) as the liquid crystal 21 is driven in such a way that the liquid crystal does not exhibit a ferroelectric phase. In this case, the operational angle of the LC molecules was 44 (=effective cone angle $2\theta_{\it eff}$). FIG. 14B shows the relationship between the applied voltage and the transmittance when the LCD device using the AFLC (3) is driven in such a way that the liquid crystal exhibits a ferroelectric phase. FIG. 14B shows the electro-optical characteristic of the LCD device in the same voltage range as in FIG. 14A.

It is apparent from FIGS. 12B, 13B and 14B that when the LCD device is driven so that the liquid crystal 21 exhibits a ferroelectric phase, the electro-optical characteristic differs between the first driving and the second driving. That is, it is understood that when the LCD device is driven so that the liquid crystal 21 exhibits a ferroelectric phase, burning of the LCD device occurs. By contrast, as apparent from FIGS. 12A, 13A and 14A, when the LCD device is driven so that the liquid crystal 21 does not exhibit a ferroelectric phase, the electro-optical characteristics in the first driving and the second driving substantially match with each other. It is understood that when the LCD device is driven so that the liquid crystal 21 does not exhibit a ferroelectric phase, no burning of the LCD device occurs which shows the effectiveness of this invention.

As apparent from FIGS. 12A, 13A and 14A, with the use of any of the liquid crystals having the properties shown on Table 1, the difference between the electro-optical characteristics in the first driving and the second driving is smaller in the case where the LCD device is driven so that the liquid crystal 21 does not exhibit a ferroelectric phase. In particular, as the cone angle $2\theta$ increases from 45°, to 50° then to 60°, the difference in the electro-optical characteristic of the liquid crystal 21 becomes smaller; with the cone angle $2\theta$ equal to 60°, the difference in electro-optical characteristic almost completely disappears.

(EXAMPLE 1-2)

The same experiment as done on the Example 1-1 was conducted on the LCD device which uses, as the liquid crystal 21, a DHF liquid crystal having a cone angle $2\theta$ of 61°, an ISO-SA transition temperature of 65.9° C., an SA-SC* transition temperature of 64.3° C., spontaneous polarization of 110 nc/cm$^2$ and a tilt angle $\theta$ of 30.5°.

For the Example 1-2, the electro-optical characteristic of the LCD device was measured as the LCD device was driven as follows.

1. When the liquid crystal is so driven as to exhibit a ferroelectric phase, pulse voltages varying from +20 V to −20 V by 0.5 V were sequentially applied between the pixel electrodes 13 and the opposing electrode 17 each for about 30 seconds, and the transmittance for each pulse voltage was measured. When the liquid crystal is so driven as not to exhibit a ferroelectric phase, pulse voltages varying from +6 V to −6 V by 0.5 V were sequentially applied between the pixel electrodes 13 and the opposing electrode 17 each for about 30 seconds, and the transmittance for each pulse voltage was measured.
(First driving)

2. Thereafter, when the liquid crystal is so driven as to exhibit a ferroelectric phase, +20 V was kept applied between the pixel electrodes 13 and the opposing electrode 17 each for about 30 minutes. When the liquid crystal is so driven as not to exhibit a ferroelectric phase, +6 V was kept applied between the pixel electrodes 13 and the opposing electrode 17 each for about 30 minutes.

3. The LCD device was driven by the same driving method as used in the first driving and the transmittance was measured for each pulse voltage. (Second driving)

Figures 15A, 15B:
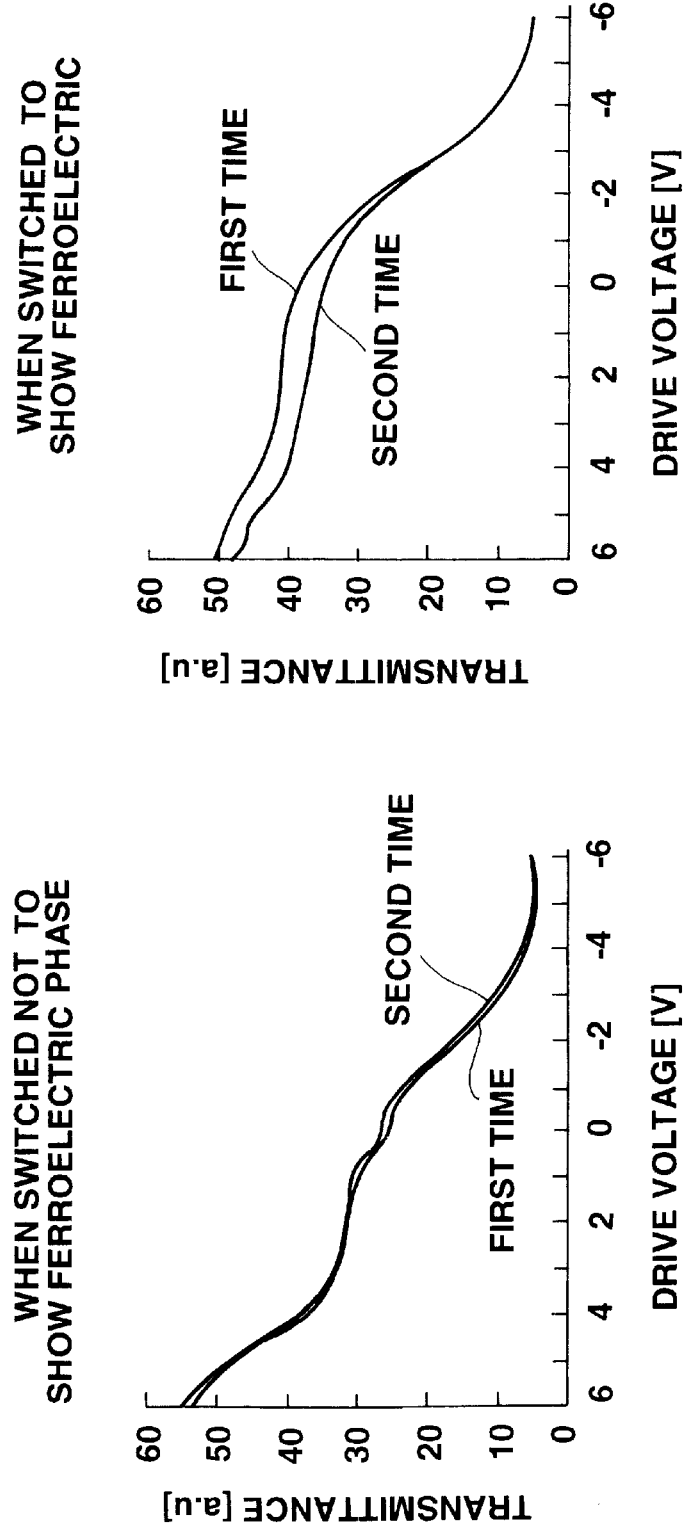
FIG. 15A is a diagram showing the relationship between the applied voltage and the transmittance when an LCD device according to an example which uses a DHF liquid crystal is so driven as not to exhibit ferroelectric phases.
FIG. 15B is a diagram showing the relationship between the applied voltage and the transmittance when the LCD device according to an example which uses the DHF liquid crystal is so driven as to exhibit ferroelectric phases.

FIG. 15A shows the relationship between the applied voltage and the transmittance when the LCD device using the DHF liquid crystal having the aforementioned property as the liquid crystal 21 is driven in such a way that the liquid crystal does not exhibits a ferroelectric phase. FIG. 15B shows the relationship between the applied voltage and the transmittance when the LCD device using the DHF liquid crystal having the aforementioned property is driven in such a way that the liquid crystal exhibits a ferroelectric phase. FIG. 15B shows the electro-optical characteristic of the LCD device in the same voltage range as in FIG. 15A.

It is apparent from FIG. 15B that when the LCD device is driven so that the liquid crystal 21 exhibits a ferroelectric phase, the electro-optical characteristic differs between the first driving and the second driving. That is, it is understood that when the LCD device is driven so that the liquid crystal 21 exhibits a ferroelectric phase, burning of the LCD device occurs. By contrast, as apparent from FIG. 15A, when the LCD device is driven so that the liquid crystal 21 does not exhibit a ferroelectric phase, the electro-optical characteristics in the first driving and the second driving substantially match with each other. It is understood that when the LCD device is driven so that the liquid crystal 21 does not exhibit a ferroelectric phase, no burning of the LCD device occurs which shows the effectiveness of this invention.

(EXAMPLE 1-3)

Then, a comparative experiment on the electro-optical characteristic of the LCD device using the AFLC (1) shown on Table 1 was conducted with respect to the driving method (1-pulse driving method) shown in FIGS. 6A–6C and the driving method (3-pulse driving method) shown in FIGS. 8A–8C.

In the Example 1-3, an LCD device using the AFLC (1) shown on Table 1 and used as the liquid crystal 21 in the Example 1-1 was fabricated.

Then, this LCD device was driven by the 1-pulse driving method and the 3-pulse driving method as follows with the selection period of 60 microseconds for each pixel at a duty ratio of 1/220.

In the 1-pulse driving method, pulse voltages varying from +5 V to −5 V by 0.5 V were applied between the pixel electrodes 13 and the opposing electrode 17 in each selection period, and the transmittance for each pulse voltage was measured. When the measurement of the transmittances up to −5 V was completed, pulse voltages varying in the reverse order from −5 V to +5 V by 0.5 V were applied between the pixel electrodes 13 and the opposing electrode 17, and the transmittance for each pulse voltage was measured.

In the 3-pulse driving method, write pulse voltages were applied between the pixel electrodes 13 and the opposing electrode 17 after pulse voltages +5 V and −5 V were applied between the pixel electrodes 13 and the opposing electrode 17 each for 20 microseconds. The write pulse voltages were varied from −5V to +5V by 0.5 V, and the transmittance for each write pulse voltage was measured. When the measurement of the transmittances up to −5 V was completed, write pulse voltages varying in the reverse order from −5 V to +5 V by 0.5 V were applied between the pixel electrodes 13 and the opposing electrode 17, after pulse voltages +5V and −5V were applied, and the transmittance for each write pulse voltage was measured.

Figures 16A, 16B:
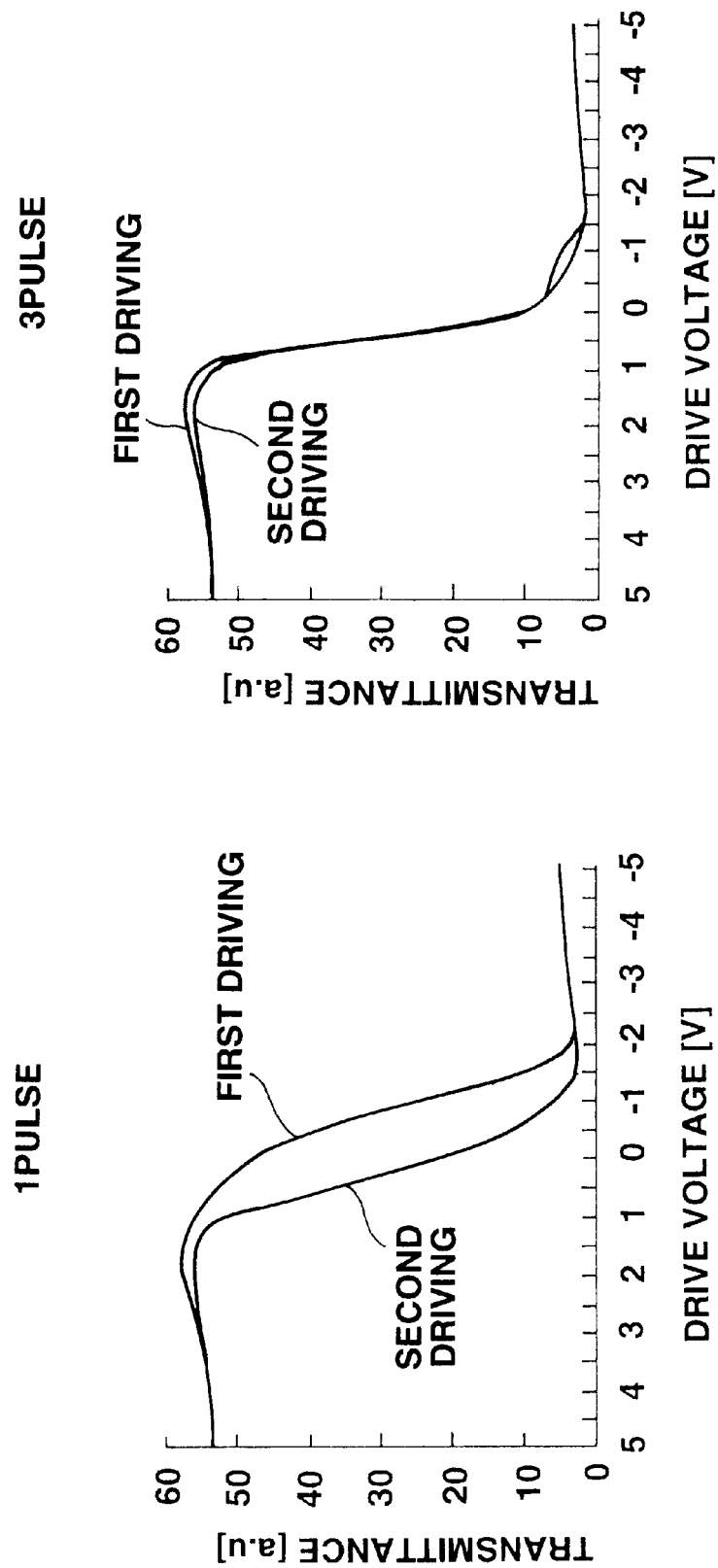
FIG. 16A is a diagram showing the electro-optical characteristic of the LCD device according to the example which uses the AFLC (1) shown on Table 1 when the LCD device is driven by a 1-pulse driving method.
FIG. 16B is a diagram showing the electro-optical characteristic of the LCD device according to the example which uses the AFLC (1) shown on Table 1 when the LCD device is driven by a 3-pulse driving method.

FIG. 16A sows the electro-optical characteristic of the LCD device driven by the 1-pulse driving method, and FIG. 16B sows the electro-optical characteristic of the LCD device driven by the 3-pulse driving method.

As shown in FIG. 16A, the 1-pulse driving method generates a hysteresis. As shown in FIG. 16B, by contrast, the 3-pulse driving method suppresses the influence of a hysteresis and can thus present stable gradation display.

Second Embodiment

The structure of an LCD device according to the second embodiment is substantially the same as that of the LCD device according to the first embodiment which has been described above.

In the LCD device of the second embodiment, as in the first embodiment, the aligning films 18 and 19 are homogeneous aligning films which have undergone an aligning treatment of rubbing in the same direction (the third direction 21C in FIG. 4 as will be discussed later). The aligning films 18 and 19 exhibit alignment restriction force to attempt the alignment of the nearby LC molecules in the aligning treatment direction 21C.

The aligning films 18 and 19 are formed of an organic high molecular compound, such as polyimide, and have undergone an aligning treatment like rubbing. The aligning films having dispersion force esd of 30 to 50, and relatively weak polar force esp of about 3 to 20 can be used.

Used as the liquid crystal 21 is an AFLC having properties such that the potential energy barrier of an antiferroelectric phase and a ferroelectric phase is smaller than that of an ordinary AFLC, the order of the ferroelectric phase is disturbed more easily with a greater phase transition precursor phenomenon, as compared with the ordinary AFLC, and the mutual action of the individual five smectic layers is weak when the AFLC is sealed between the substrates.

The liquid crystal 21 has a layer structure and a helical structure of aligned molecules in a bulk state; adjoining LC molecules has a double helical structure with helixes drawn by the LC molecules shifted by approximately 180° on an imaginary cone layer by layer, and the spontaneous polarizations of the LC molecules in adjoining smectic layers are canceled out each other.

According to the second embodiment, the layer thickness of the liquid crystal 21 (the cell gap of the LCD device 25) is about 1.5 $\mu$ which is substantially equal to one pitch (natural pitch) of the helical structure of a liquid crystal material. Therefore, the double helical structure of the LC molecules vanishes.

The liquid crystal 21 of the LCD device according to the second embodiment, when sealed in the LC cell 25, is susceptible to the mutual action (interface effect) at the interface between the aligning films 18 and 19 or the influence of the alignment restriction force by the aligning treatment. There is no relativity in the inclinations of the LC molecules between the layers of the layer structure of the liquid crystal of a smectic phase. The liquid crystal whose LC molecules are aligned without association between the smectic layers is in a phase where there is no relativity between layers when no electric field is applied, i.e., the direction of the director and the directions of spontaneous polarizations are at random. When a sufficient high voltage is applied, on the other hand, spontaneous polarizations are aligned in accordance with the electric field and their directions are inverted in accordance with the polarity of the applied voltage.

FIGS. 17A through 17E show the responses on the molecular level when no electric field is applied to the liquid crystal whose LC molecules are aligned without association between the smectic layers and an electric field is applied.

Figures 17A, 17B, 17C, 17D, 17E:
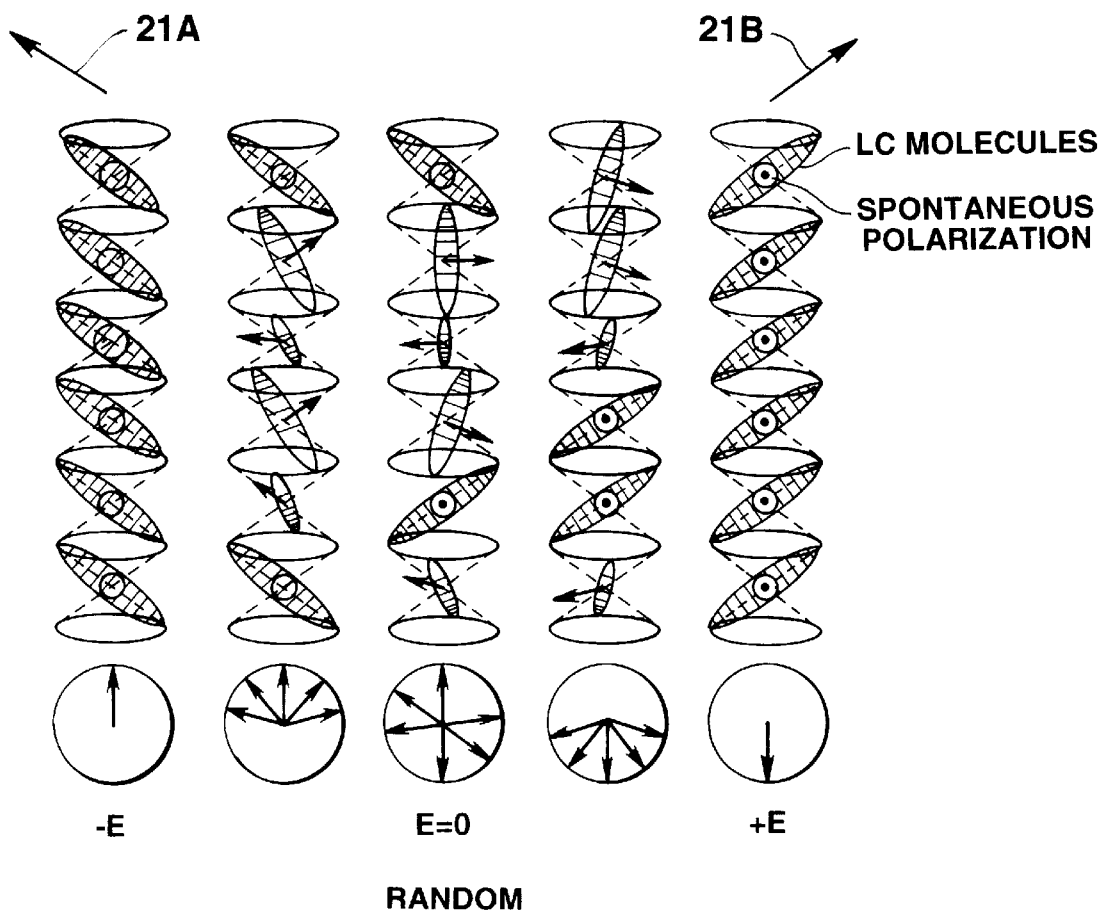
FIGS. 17A–17E are diagrams is a diagram illustrating the transition of the electric field induction phase of an AFLC with LC molecules aligned without association between smectic layers used in an LCD device according to the second embodiment of this invention.

With no voltage applied, as shown in FIG. 17A, the long-axis directions and spontaneous polarizations of the LC molecules are not associated with each other between the smectic layers, and the director of the liquid crystal 21 substantially matches with the normal-line direction of the layer structure of the liquid crystal of a smectic phase.

When a sufficiently high voltage (equal to or greater than the saturation voltage Vs) of one polarity is applied, the spontaneous polarizations are aligned between the layers and nearly all the LC molecules are directed in the first direction 21A as shown in FIG. 17B due to the mutual effect of the applied voltage and the spontaneous polarizations.

When a sufficiently high voltage (equal to or greater than the saturation voltage Vs) of the other polarity is applied, the spontaneous polarizations are aligned between the layers in the opposite direction to the one in the case of FIG. 17B and nearly all the LC molecules are directed in the second direction 21B as shown in FIG. 17C due to the mutual effect of the applied voltage and the spontaneous polarizations.

When an intermediate voltage is applied, an intermediate alignment state is provided as shown in FIGS. 17D and 17E due to the mutual effect of the applied voltage and the spontaneous polarizations. Therefore, the director of the liquid crystal 21 continuously changes between the first direction 21A and the second direction 21B in accordance with the applied voltage.

For the LCD device according to the second embodiment, the relation among the direction of the aligning treatment performed on the aligning films 18 and 19, the transmission axes 23A and 24A of the polarization plates 23 and 24 and the aligning directions of the LC molecules is the same as the one in the first embodiment shown in FIG. 4. A change in the transmittance of the LCD device when a sawtooth-like voltage of a relatively low frequency (about 0.1 Hz) is applied between the pixel electrodes 13 and the opposing electrode 17 becomes substantially the same as the one in the first embodiment shown in FIG. 6.

Since this LCD device is of an active matrix type too, a voltage which keeps the liquid crystal 21 in any alignment state can be held even during a non-selection period. This LCD device can therefore ensure gradation display by changing the transmittance.

The transmittance of this LCD device becomes minimum when the director of the liquid crystal 21 is parallel to the transmission axis 23A of the polarization plate 23, and becomes maximum when that director intersects the transmission axis 23A at 45°. If this LCD device is used in an alignment state where the transmittance shows Tmin and Tmax, the liquid crystal 21 can be driven without being aligned in the first or second alignment state. The first and second alignment states are the states of a ferroelectric phase where all the molecules in the layer of the liquid crystal 21 are completely aligned in the same direction. In the state where the LC molecules show a ferroelectric phase, charges produced by the spontaneous polarization are apt to be held on the inner surfaces of the substrates 11 and 12. This makes the inversion of the LC molecules difficult, which makes it easier to cause burning.

In an alignment state where the LC molecules are not completely aligned and do not exhibit a ferroelectric phase, however, it is difficult for the charges produced by the spontaneous polarization to be held on the inner surfaces of the substrates 11 and 12. The inversion of the LC molecules easily occurs with the unaligned molecules as the core, thus reducing burning. In other words, by changing the drive voltage to be applied between the pixel electrodes 13 and the opposing electrode 17 within the range from VTmax to VTmin, the liquid crystal 21 can be driven without setting a ferroelectric phase, thus allowing the LCD device to display continuous gradation.

The LCD device according to the second embodiment should also be driven by the driving method illustrated in FIGS. 6A–6C or the driving method illustrated in FIGS. 8A–8C both of the first embodiment. The column drivers 32 which accomplish those driving methods should be designed as those in the first embodiment which are shown in FIGS. 7 and 9.

Specific examples of the LCD device according to the second embodiment and the method of driving the same will now be described.

(EXAMPLE 2-1)

Three kinds of AFLCs (1) having the properties as given on Table 1 of the first embodiment were prepared with the liquid crystals shown by (I) to (III) in the chemical formula 1 as the basic compositions.

Then, LCD devices which had the structure as shown in FIGS. 1–4 and respectively used those AFLCs (1) were fabricated. The electro-optical characteristics of those fabricated LCD devices were measured as the LCD devices were driven by the same driving methods as employed for the Example 1-1.

In this experiment, the polarization plate 23 of the LCD device was arranged with its transmission axis 23A inclined by 22.5° to the line normal to the layer having a layer structure of a smectic phase (smectic layer), while the transmission axis 24A of the other polarization plate 24 was set perpendicular to the transmission axis 23A of the polarization plate 23.

Figures 18A, 18B:
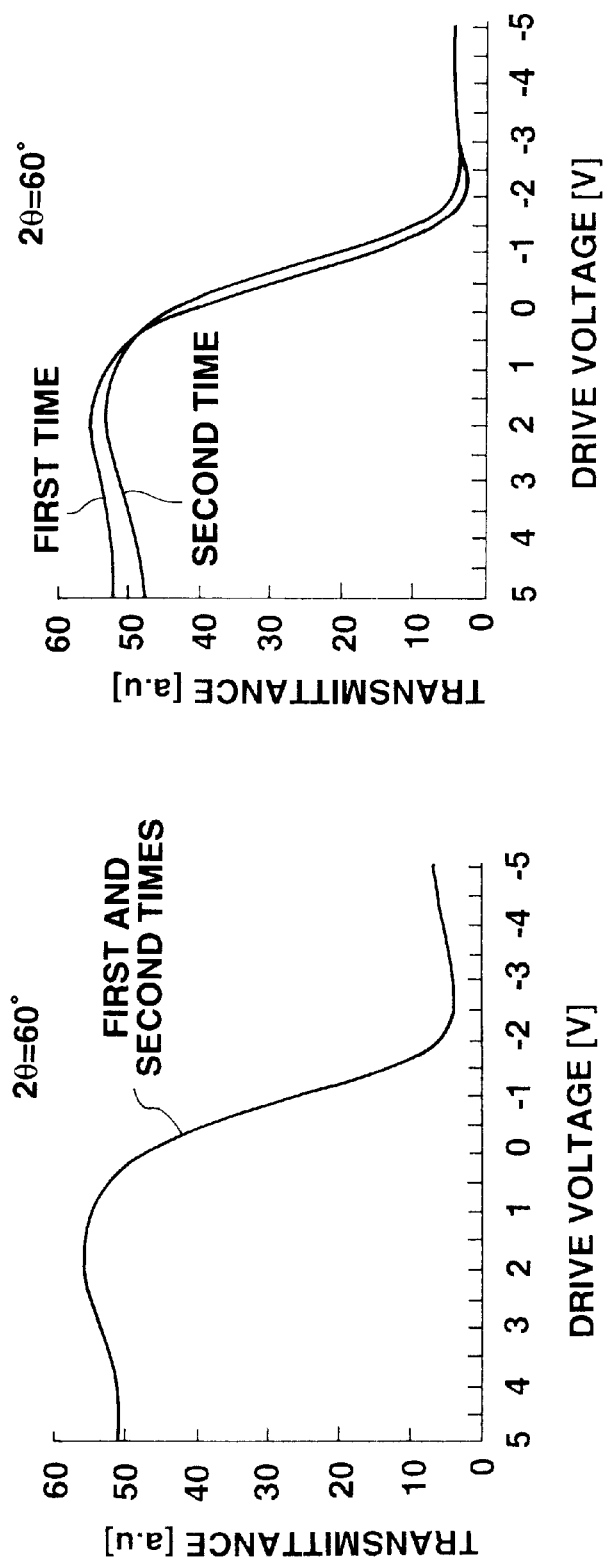
FIG. 18A is a diagram showing the relationship between the applied voltage and transmittance when an LCD device according to an example which uses an AFLC with LC molecules aligned without association between smectic layers is so driven as not to exhibit ferroelectric phases.
FIG. 18B is a diagram showing the relationship between the applied voltage and transmittance when an LCD device according to the example which uses an AFLC with LC molecules aligned without association between smectic layers is so driven as to exhibit ferroelectric phases.

FIGS. 18A and 18B show the transmittances of the LCD devices obtained in the first driving and the second driving by such a driving method.

FIG. 18A shows the relationship between the applied voltage and the transmittance when the LCD device is driven in such a way that the liquid crystal does not exhibit a ferroelectric phase. FIG. 18B shows the relationship between the applied voltage and the transmittance when the LCD device is driven in such a way that the liquid crystal exhibits a ferroelectric phase. FIG. 18B shows the electro-optical characteristic of the LCD device in the same voltage range as in FIG. 18A.

It is apparent from FIG. 18B that when the LCD device is driven so that the liquid crystal 21 exhibits a ferroelectric phase, the electro-optical characteristic differs between the first driving and the second driving. That is, it is understood that when the LCD device is driven so that the liquid crystal 21 exhibits a ferroelectric phase, burning of the LCD device occurs. By contrast, as apparent from FIG. 18A, when the LCD device is driven so that the liquid crystal 21 does not exhibit a ferroelectric phase, the electro-optical characteristics in the first driving and the second driving substantially match with each other. When the LCD device is driven so that the liquid crystal 21 does not exhibit a ferroelectric phase, no burning of the LCD device occurs from which it is understood that this invention is effective.

Third Embodiment

The first and second embodiments have been described with reference to the case where the LCD device is driven without consideration on a change in the temperature of the liquid crystal 21. As the liquid crystal 21 has spontaneous polarization, however, the alignment state varies in accordance with a temperature change. The electro-optical characteristic of the liquid crystal 21 therefore varies in accordance with a temperature change, changing the gradation of an image to be displayed.

Figure 19:
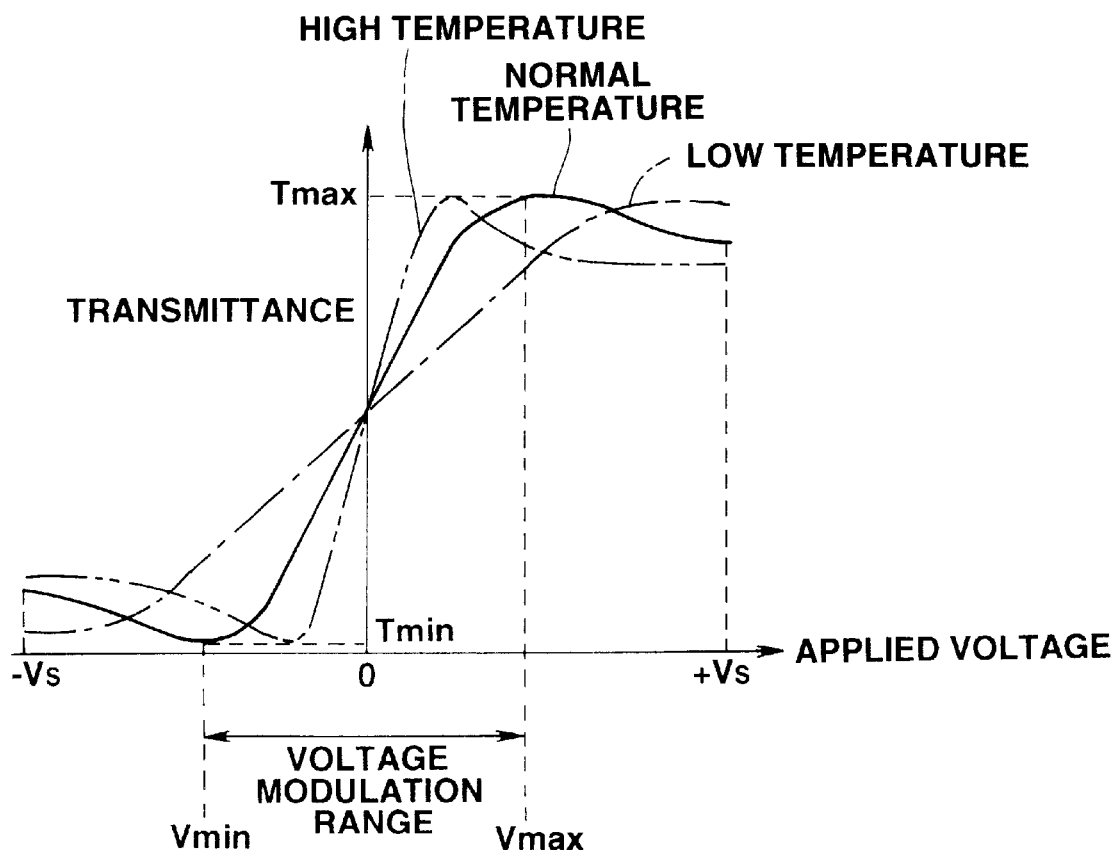
FIG. 19 is a diagram showing the relationship between the applied voltage to the liquid crystal and the transmittance for each temperature.

FIG. 19 exemplifies a variation in electro-optical characteristic with a change in the temperature of the liquid crystal 21. In FIG. 19, the solid line shows the electro-optical characteristic when the temperature of the liquid crystal is the normal temperature (25° C.), the one-dot chain line indicates the electro-optical characteristic when the temperature of the liquid crystal is lower (10° C.) than the normal temperature, and the two-dot chain line indicates the electro-optical characteristic when the temperature of the liquid crystal is higher (50° C.) than the normal temperature. When the voltage VTmin at which the transmittance shows the minimum value in those electro-optical characteristics is applied at the normal temparatuer, the director substantially coincides with the direction of the transmission axis 23A of the polarization plate 23. When the voltage VTmax at which the transmittance shows the maximum value is applied at the normal temparatuer, the director is directed to the 21D which intersects the direction of the transmission axis 23A of the polarization plate 23 approximately at 45°. Therefore, the director of the liquid crystal changes its direction by approximately 45° as the applied voltage is changed from VTmin to VTmax.

As apparent from FIG. 19, when the temperature of the liquid crystal 21 is low, the cone angle 2θ becomes large so that the absolute value of the voltage for obtaining the transmittances Tmin and Tmax becomes larger and the voltage variation range become wider. As the transmittance with respect to the same applied voltage varies with a change in transmittance, the gradation to be displayed deviates with a temperature change, which makes it difficult to provide the accurate gradation display.

A description will now be given of an LCD device and a method of driving the same both designed in consideration of a change in the temperature of the liquid crystal 21.

Figure 20:
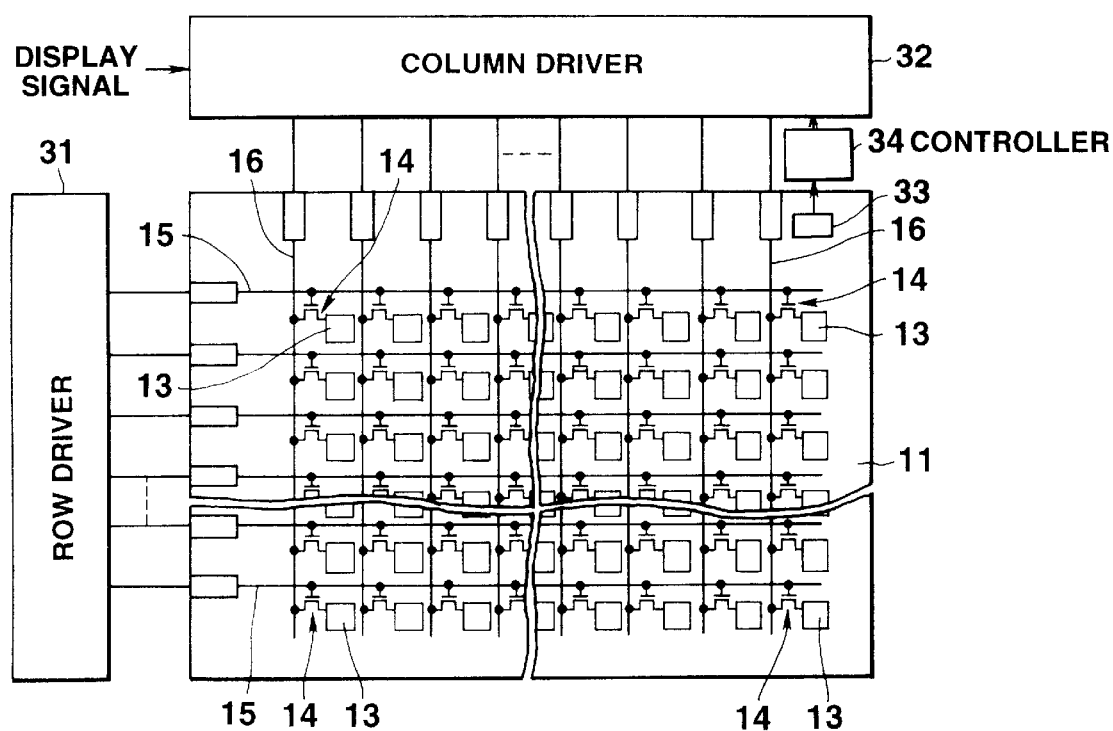
FIG. 20 is a plan view showing the structure of a lower substrate of the LCD device according to the third embodiment.

While the LCD device according to the third embodiment has substantially the same structure as that of the LCD device of the first embodiment, a temperature sensor 33 is provided in the non-display area of the lower substrate 11 as shown in FIG. 20. The temperature sensor 33 indirectly detects the temperature of the liquid crystal 21 by sensing the temperature of the lower substrate 11. The temperature sensor 33 is connected to a controller 34 for temperature compensation of a data signal. The output signal of the controller 34 is supplied to the column driver 32. In this embodiment, the structure of the column driver 32 differs from that in the first embodiment, as will be discussed later, to effect temperature compensation of the data signal from the controller 34.

Figure 21:
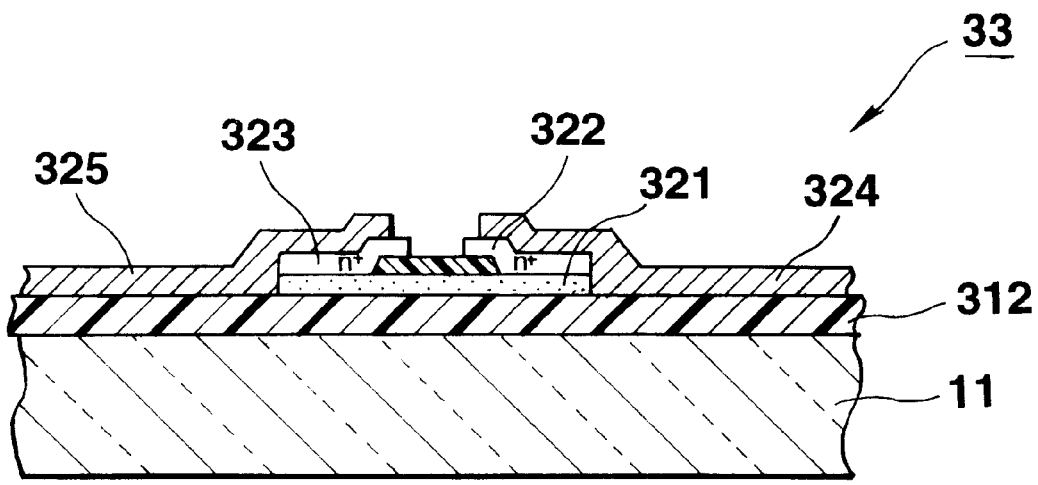
FIG. 21 is a cross-sectional view showing the structure of a temperature sensor of the LCD device shown in FIG. 20.

The temperature sensor 33, as shown in FIG. 21, comprises an intrinsic semiconductor layer 321 formed on a gate insulator film 312 and electrodes 324 and 325 connected to both end portions of the intrinsic semiconductor layer 321 via contact layers 322 and 323.

The intrinsic semiconductor layers 313 and 321 are formed of amorphous silicon, polycrystalline silicon, monocrystalline silicon or the like which hardly contains an impurity. The contact layers 322 and 323 are formed of amorphous silicon, polycrystalline silicon, monocrystalline silicon or the like which is added with an n type impurity.

The mobility of carriers in the intrinsic semiconductor layer 321 changes with the temperature. So does the substantial electrical resistivity of the intrinsic semiconductor layer 321. Accordingly, the temperature sensor 33 can detect the temperature by discriminating the resistance of the intrinsic semiconductor layer 321.

According to the third embodiment, the voltage of the data signal is adjusted in accordance with the temperature detected by the temperature sensor 33 in such a manner that the voltage VTmin which provides the transmittance Tmin in association with image data designating the lowest transmittance is applied to the liquid crystal 21, and the voltage VTmax which provides the transmittance Tmax in association with image data designating the highest transmittance is applied to the liquid crystal 21. That is, the voltage of the data signal is adjusted in accordance with the temperature detected by the temperature sensor 33 in such a way that the director of the liquid crystal 21 is directed to a direction substantially matching with the direction of the transmission axis 23A of the polarization plate 23 in association with image data designating the lowest transmittance, and the director of the liquid crystal 21 is directed to the direction 21D intersecting the direction of the transmission axis 23A of the polarization plate 23 by approximately 45° in association with image data designating the highest transmittance.

To accomplish this adjustment, the voltage of the data signal to be applied to the liquid crystal is changed so that the director of the liquid crystal 21 which is aligned by one of the data signals associated with image data designating the lowest transmittance or image data designating the highest transmittance is set to be substantially coincident to either the direction of the transmission axis 23A of the polarization plate 23 or the direction 21D inclined by approximately 45° to the direction of the transmission axis 23A. To direct the director of the liquid crystal 21 aligned by the other data signal in the other direction, the voltage variation range of the data signal to be applied is adjusted.

Figure 22:
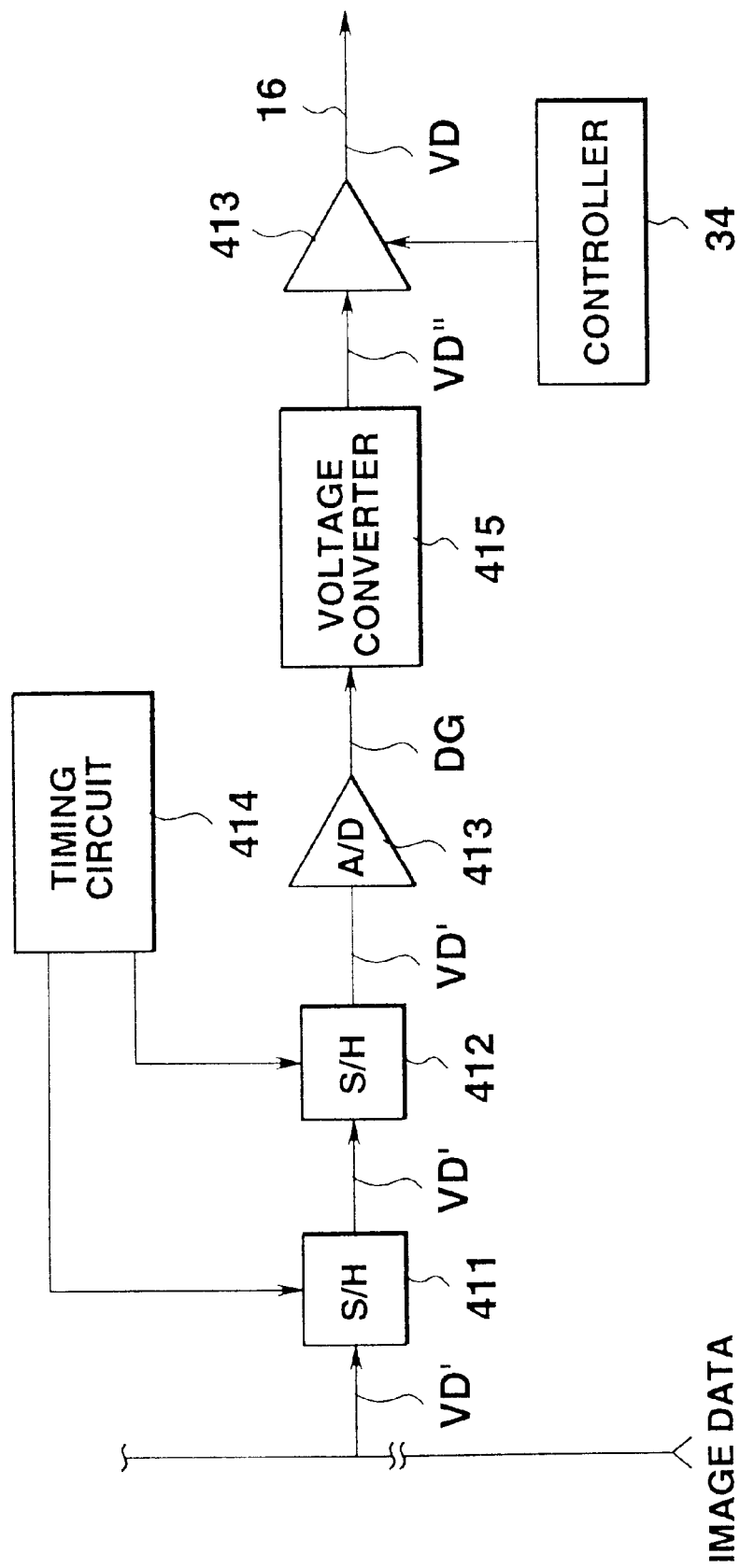
FIG. 22 is a block diagram depicting the circuit structure of a column driver for accomplishing the driving method, shown in FIGS. 6A–6C, according to the third embodiment.

FIG. 22 exemplifies the structure of the column driver 32 capable of adjusting the voltage of the data signal in accordance with the temperature. Like or same reference numerals are given to those components of the column driver 32 which are the same as the corresponding components of the column driver 32 in FIG. 7.

This column driver 32 comprises a first sample and hold circuit 411, a second sample and hold circuit 412, an A/D converter 413, a timing circuit 414, a voltage converter 415 and a driver circuit 431. The column driver 32 shown in FIG. 22 differs from that shown in FIG. 7 in that the output signal VD" of the voltage converter 415 is not applied to the data lines 16, but is supplied to the driver circuit 431.

The driver circuit 431, comprised of an operational amplifier having a relatively large driving performance, amplifies the pulse signal VD" and adds a bias voltage to the amplified signal to drive the data lines 16. The controller 34 sets the amplification factor α of the driver circuit 431 in accordance with an equation (1) and sets a bias voltage Vb in accordance with an equation (2).

$$\alpha = A(1 + B(t-tr)/tr) \qquad (1)$$

where A and B are constants, t is the measuring temperature and tr is a reference temperature.

$$Vb = (VTmax(t) + VTmin(t))/2 \qquad (2)$$

where VTmax(t) is the applied voltage when the maximum gradation Tmax is acquired at the measuring temperature t and VTmin(t) is the applied voltage when the minimum gradation Tmin is acquired at the measuring temperature t.

The constants A and B, and the applied voltages VTmax(t) and VTmin(t) should empirically be obtained and should be set in the controller 34 in advance.

The output voltage VD" of the voltage converter 415 is applied to the liquid crystal in the write period in which the TFTs 14 in the associated row are turned on through the driver circuit 431, and is held between the opposite electrodes 13 and 17 during the OFF duration of the TFTs 14.

The first sample and hold circuit 411, the second sample and hold circuit 412, the A/D converter 413, the voltage converter 415 and the driver circuit 431 are arranged for each column of pixels, and the timing circuit 414 is commonly provided for a plurality of columns.

In accordance with the output of the temperature sensor 33, the controller 34 adjusts the offset voltage and amplification factor of the driver circuit 431. In other words, the amplification factor α and the bias voltage Vb are adjusted in accordance with a temperature change so that the director of the liquid crystal 21 is set to substantially match with the transmission axis 23A of the polarization plate 23 at the time of displaying "black" of the lowest gradation and the director of the liquid crystal 21 is set to substantially match with the direction 21D at the time of displaying "white" of the highest gradation. The directors for the other gradations should be set to the desired respective positions.

A method of driving the LCD device according to the third embodiment will now be described.

The LCD device driving method according to the third embodiment is the same as that of the first embodiment illustrated in FIGS. 6A–6C. In the third embodiment, however, the controller 34 adjusts the offset voltage and amplification factor of the driver circuit 431 in accordance with the temperature of the liquid crystal 21 that has been detected by the temperature sensor 33. The pulse voltage VD to be applied to the data lines 16 by the column driver 32 is therefore set in the light of changes in VTmin and VTmax caused by the temperature change of the liquid crystal 21.

By driving the LCD device according to the third embodiment in the above-described manner, therefore, an image can be displayed with gradation specified by the analog display signal without being affected by the temperature change.

When the lowest display gradation or "black" is designated by the analog display signal, for example, the director of the liquid crystal 21 is set substantially parallel to the direction of the transmission axis 23A of the polarization plate 23 regardless of the temperature. This can permit "black" of the lowest gradation to be displayed. When the highest display gradation or "white" is designated by the analog display signal, the director of the liquid crystal 21 is set substantially parallel to the direction 21D which is inclined by 45° to the direction of the transmission axis 23A of the polarization plate 23 regardless of the temperature. Therefore, "white" of the highest gradation can be displayed. The LCD device according to the third embodiment can display "black" of the lowest gradation and "white" of the highest gradation and can thus display a clear image with high contrast.

When the liquid crystal 21 has a large hysteresis in the electro-optical characteristic shown in FIG. 19, the display gradation corresponding to the voltage of the data pulse is not specifically determined by the driving method shown in FIGS. 6A–6C. In such a case, another driving method as illustrated in FIGS. 8A through 8C, should be employed as per the first embodiment.

Figure 23:
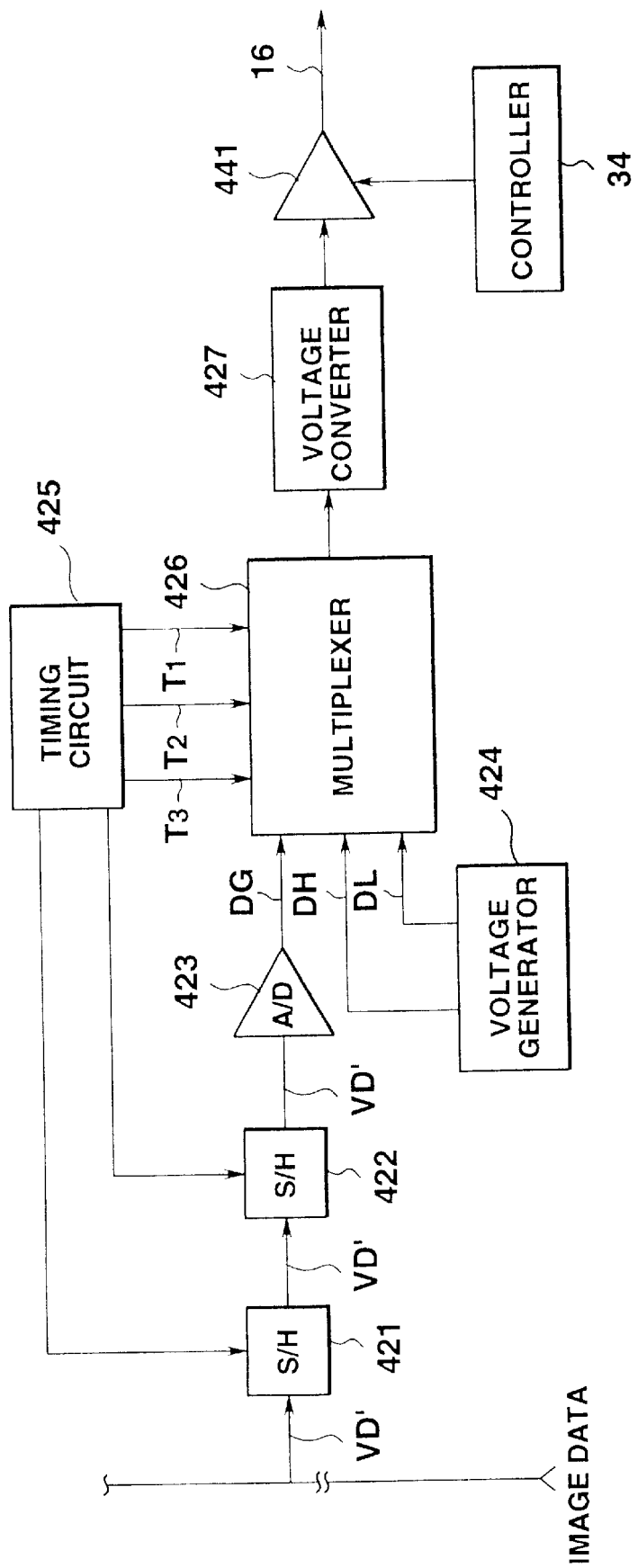
FIG. 23 is a block diagram depicting the circuit structure of a column driver for accomplishing the driving method, shown in FIGS. 8A–8C, according to the third embodiment.

The circuit structure of the column driver 32 which drives the LCD device by the driving method illustrated in FIGS. 8A–8C is illustrated in FIG. 23.

This column driver 32 comprises a first sample and hold circuit 421, a second sample and hold circuit 422, an A/D converter 423, a voltage data generator 424, a timing circuit 425, a multiplexer 426, a voltage converter 427 and a driver circuit 441. The column driver 32 shown in FIG. 23 differs from that shown in FIG. 9 in that the output signal of the voltage converter 427 is not applied to the data lines 16, but is supplied to the driver circuit 441. The driver circuit 441 controls the voltage of the gradation pulse VD under the control of the controller 34.

The first sample and hold circuit 421, the second sample and hold circuit 422, the A/D converter 423, the multiplexer 426, the voltage converter 427 and the driver circuit 441 are arranged for each column of pixels, and the timing circuit 425 and the voltage data generator 424 are commonly provided for a plurality of columns.

According to the driving method shown in FIGS. 8A–8C, the controller 34 also adjusts the offset voltage and the amplification factor in accordance with the output of the temperature sensor 33. That is, the amplification factor a and the bias voltage Vb are adjusted in accordance with a temperature change, so that the director of the liquid crystal is set to substantially match with the transmission axis 23A of the polarization plate 23 at the time of displaying "black" of the lowest gradation and the director of the liquid crystal is set to substantially match with the direction 21D at the time of displaying "white" of the highest gradation. The directors for the other gradations should be set to the desired respective positions.

By driving the LCD device according to the third embodiment in the above-described manner, therefore, an image can be displayed with gradation specified by the analog display signal without being affected by the temperature change.

Even when the liquid crystal 21 in the LCD device according to the third embodiment has a large hysteresis in the electro-optical characteristic, the display gradation corresponding to the gradation pulse VD is specifically determined.

As described above, the LCD device according to the third embodiment can display a high-grade image without being affected by the temperature change.

According to the LCD device driving method according to the third embodiment, the spontaneous polarizations PS are not completely aligned. This makes it difficult to cause display burning so that a high-quality image can be displayed.

Since the LCD device according to the third embodiment uses a liquid crystal of a chiral smectic phase having spontaneous polarization PS as the liquid crystal 21, the response speed is fast and the angle of visibility is wide.

The LCD device according to the third embodiment can be driven by a DC voltage too. According to the LCD device of this embodiment, a single voltage is applied for a single gradation unlike in the case of AC driving where two voltages of different polarities are applied for a single gradation. It is therefore possible to suppress the occurrence of flickering.

Measuring the temperature of the liquid crystal and changing the voltage to be applied between the electrodes in accordance with a change in the temperature of the liquid crystal as in the third embodiment can be adapted to the LCD device of the second embodiment which uses a liquid crystal having its molecules aligned without association between the smectic layers.

According to the third embodiment, the voltage to be applied to the liquid crystal 21 is controlled in accordance with the result of the detection of the temperature of the liquid crystal 21 by the temperature sensor 33 to thereby adjust the control of the image to be displayed. Alternatively, the brightness of the image to be displayed may be detected and the detected brightness may be compared with the original brightness of the image to be displayed, so that the voltage to be applied to the liquid crystal 21 is controlled based on the comparison result. This scheme can also compensate for the contrast of the display image.

MODIFICATIONS OF EMBODIMENTS

This invention can use other liquid crystals having spontaneous polarization, like a liquid crystal having a skeleton structure expressed by a chemical formula 2.

Chemical Formula 2

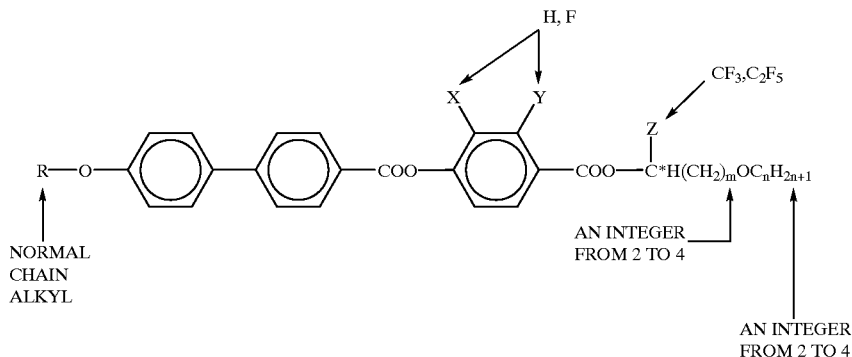

This invention may be adapted to a color LCD device in which color filters for selectively passing only the lights of individual wavelength components of red, green and blue are arranged in a predetermined order to display a full color image.

This invention is not limited to an LCD device using TFTs as active elements, but may be adapted to an LCD device using other types of active elements, such as MIMs (Metal Insulator Metals).

Figure 24:
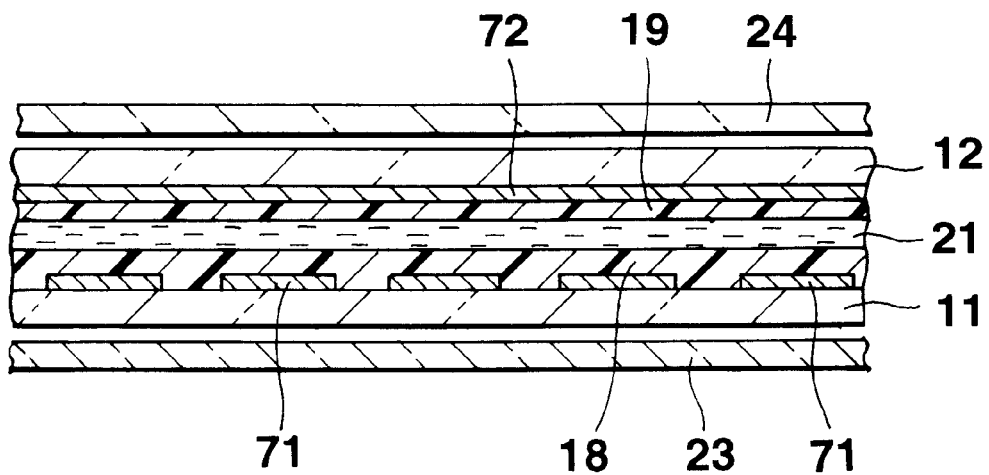
FIG. 24 is a cross-sectional view showing another example of the structure of an LCD device to which this invention is adapted.

As shown in FIG. 24, this invention may be adapted to a passive matrix type LCD device which has scan electrodes 71 and signal electrodes 72 arranged on the opposing surfaces of the opposing substrates 11 and 12 with the signal electrodes 72 lying perpendicular to the scan electrodes 71. This invention may also be adapted to an LCD device which is driven by a static driving scheme.

What is claimed is:

1. A liquid crystal display device comprising:
   a pair of substrates on whose opposing surfaces electrodes are formed;
   a liquid crystal, exhibiting ferroelectric phases, placed between said pair of substrates, said liquid crystal having a first alignment state exhibiting a first ferroelectric phase where liquid crystal molecules are aligned substantially in a first direction in accordance with a first voltage of one polarity applied between said electrodes, a second alignment state exhibiting a second ferroelectric phase where said liquid crystal molecules are aligned substantially in a second direction in accordance with a second voltage of the other polarity applied between said electrodes, and a third alignment state where a director of said liquid crystal is directed in a third direction substantially matching with a normal-line direction of a layer of a smectic phase when no voltage is applied between said electrodes, wherein said director of said liquid crystal is directed between said first direction and said second direction in accordance with application of an arbitrary third voltage between said first voltage and said second voltage; and
   first and second polarization plates, arranged so as to sandwich said pair of substrates such that an optical axis of said first polarization plate is set in an angular range defined by either one of said first and second directions and said third direction, and an optical axis of said second polarization plate is substantially perpendicular or parallel to the optical axis of said first polarization plate.

2. The liquid crystal display device according to claim 1, wherein said optical axis of said first polarization plate is set in a direction intersecting said third direction at an angle of approximately 22.5°.

3. The liquid crystal display device according to claim 1, wherein given that an angle defined by said first and second directions is $2\theta$, said optical axis of said first polarization plate is set in a direction intersecting said third direction at an angle of less than $\theta$.

4. The liquid crystal display device according to claim 1, wherein given that an angle defined by said first and second directions is $2\theta$, said optical axis of said first polarization plate is set in a direction intersecting one of said first and second directions at an angle obtained by subtracting 45° from said angle $2\theta$.

5. The liquid crystal display device according to claim 1, wherein an angle $2\theta$ defined by said first and second directions is equal to or greater than 45°.

6. The liquid crystal display device according to claim 5, wherein said optical axis of said first polarization plate is set in a direction intersecting said third direction at an angle of less than $\theta$.

7. The liquid crystal display device according to claim 5, wherein said optical axis of said first polarization plate is set in a direction intersecting said third direction at an angle of approximately 22.5°.

8. The liquid crystal display device according to claim 5, wherein said optical axis of said first polarization plate is set in a direction intersecting one of said first and second directions at an angle obtained by subtracting 22.5° from said angle $2\theta$.

9. The liquid crystal display device according to claim 5, wherein said optical axis of said first polarization plate is set in a direction intersecting one of said first and second directions at an angle obtained by subtracting 45° from said angle $2\theta$.

10. The liquid crystal display device according to claim 1, wherein an angle $2\theta$ defined by said first and second directions is equal to or greater than 50°.

11. The liquid crystal display device according to claim 10, wherein said optical axis of said first polarization plate is set in a direction intersecting said third direction at an angle of less than $\theta$ and greater than 22.5°.

12. The liquid crystal display device according to claim 10, wherein said optical axis of said first polarization plate is set in a direction intersecting said third direction at an angle equal to or greater than 2.5°.

13. The liquid crystal display device according to claim 10, wherein said optical axis of said first polarization plate is set in a direction intersecting said third direction at an angle equal to or greater than 5°.

14. The liquid crystal display device according to claim 1, wherein an angle $2\theta$ defined by said first and second directions is equal to or greater than 60°.

15. The liquid crystal display device according to claim 14, wherein said optical axis of said first polarization plate is set in a direction intersecting one of said first and second directions at an angle equal to or greater than 7.5°.

16. The liquid crystal display device according to claim 14, wherein said optical axis of said first polarization plate is set in a direction intersecting one of said first and second directions at an angle equal to or greater than 15°.

17. The liquid crystal display device according to claim 1, wherein said liquid crystal has a monostable property.

18. The liquid crystal display device according to claim 17, wherein said liquid crystal comprises an antiferroelectric phase liquid crystal showing a chiral smectic CA phase in a bulk state.

19. The liquid crystal display device according to claim 17, wherein said liquid crystal comprises an antiferroelectric phase liquid crystal showing a smectic CA phase with no voltage applied between said electrodes.

20. The liquid crystal display device according to claim 1, wherein said liquid crystal comprises a DHF (Deformed Helical Ferroelectric) liquid crystal.

21. The liquid crystal display device according to claim 1, wherein said liquid crystal comprises a liquid crystal whose liquid crystal molecules are aligned between smectic layers without association.

22. The liquid crystal display device according to claim 21, wherein said liquid crystal comprises a mixture of a liquid crystal compound showing a chiral smectic CR phase and a liquid crystal compound showing a chiral smectic C phase.

23. The liquid crystal display device according to claim 21, wherein said liquid crystal comprises an antiferroelectric phase liquid crystal compound having a chiral terminal chain bonded to ether and a phenyl ring subjected to fluorine reduction.

24. The liquid crystal display device according to claim 1 further comprising:

drive means for applying a voltage to said liquid crystal between said electrodes, said voltage causing said director of said liquid crystal to vary within an angular range narrower than an angular range defined by said first and second directions; and contrast compensation means for controlling a voltage to be applied to said liquid crystal to thereby compensate a contrast of an image to be displayed by changing said director of said liquid crystal.

25. The liquid crystal display apparatus according to claim 24, wherein said drive means has means for applying a first voltage corresponding to a maximum gradation of said image to be displayed and a second voltage corresponding to a minimum gradation of said image to be displayed to said liquid crystal.

26. The liquid crystal display apparatus according to claim 24, wherein said drive means applies a voltage for causing said director of said liquid crystal to vary within a range of 45° to said liquid crystal.

27. The liquid crystal display apparatus according to claim 24, wherein said contrast compensation means includes:

temperature detection means for detecting a temperature of said liquid crystal; and voltage compensation means for compensating said voltage to be applied to said liquid crystal by said drive means, in accordance with said temperature detected by said temperature detection means.

28. The liquid crystal display apparatus according to claim 27, wherein said voltage compensation means has means for compensating a range of a value of an applied voltage and an offset voltage in accordance with said temperature.

29. A liquid crystal display device comprising:

a pair of substrates on whose opposing surfaces electrodes are formed;

a liquid crystal, exhibiting ferroelectric phases, placed between said pair of substrates, said liquid crystal having a first alignment state exhibiting a first ferroelectric phase where liquid crystal molecules are aligned substantially in a first direction in accordance with a first voltage of one polarity applied between said electrodes, a second alignment state exhibiting a second ferroelectric phase where said liquid crystal molecules are aligned substantially in a second direction in accordance with a second voltage of the other polarity applied between said electrodes, and a third alignment state where a director of said liquid crystal is directed in a third direction substantially matching with a normal-line direction of a layer of a smectic phase when no voltage is applied between said electrodes, wherein an angle 2θ defined by said first and second directions is equal to or greater than 90°, and wherein said director of said liquid crystal is directed between said first direction and said second direction in accordance with application of an arbitrary third voltage between said first voltage and said second voltage; and first and second polarization plates, arranged so as to sandwich said pair of substrates such that an optical axis of said first polarization plate is set in an angular range defined by said first and second directions, and an optical axis of the second polarization plate is substantially perpendicular or parallel to the optical axis of said first polarization plate.

30. A liquid crystal display device comprising:

a pair of substrates on whose opposing surfaces electrodes are formed;

a liquid crystal, exhibiting ferroelectric phases, placed between said pair of substrates, said liquid crystal having a first alignment state exhibiting a first ferroelectric phase where liquid crystal molecules are aligned substantially in a first direction in accordance with a first voltage of one polarity applied between said electrodes, a second alignment state exhibiting a second ferroelectric phase where said liquid crystal molecules are aligned substantially in a second direction in accordance with a second voltage of the other polarity applied between said electrodes, and a third alignment state where a director of said liquid crystal is directed in a third direction substantially matching with a normal-line direction of a layer of a smectic phase when no voltage is applied between said electrodes, wherein an angle 2θ defined by said first and second directions is greater than 45°, and wherein said director of said liquid crystal are directed between said first direction and said second direction in accordance with application of an arbitrary third voltage between said first voltage and said second voltage; and first and second polarization plates, arranged so as to sandwich said pair of substrates such that an optical axis of said first polarization plate is set in an angular range defined by either one of said first and second directions and said third direction, and an optical axis of said second polarization plate is substantially perpendicular or parallel to the optical axis of said first polarization plate.

31. A liquid crystal display device comprising:

a pair of substrates on whose opposing surfaces electrodes are formed;

a liquid crystal, exhibiting ferroelectric phases, placed between said pair of substrates, said liquid crystal having a first alignment state exhibiting a first ferroelectric phase where liquid crystal molecules are aligned substantially in a first direction in accordance with a first voltage of one polarity applied between said electrodes, a second alignment state exhibiting a second ferroelectric phase where said liquid crystal molecules are aligned substantially in a second direction in accordance with a second voltage of the other polarity applied between said electrodes, and a third alignment state where a director of said liquid crystal is directed in a third direction substantially matching with a normal-line direction of a layer of a smectic phase when no voltage is applied between said electrodes, wherein said director of said liquid crystal is directed between said first direction and said second direction in accordance with application of an arbitrary third voltage between said first voltage and said second voltage; and a pair of polarization plates, arranged so as to sandwich said pair of substrates such that a half of an angle defined by optical axes of said polarization plates is smaller than an angle 2θ defined by said first and second directions.

32. The liquid crystal display device according to claim 31, wherein said optical axes of said pair of polarization plates are substantially perpendicular to each other.

33. The liquid crystal display device according to claim 31, wherein one of said optical axes intersects one of said first and second directions within an angular range defined by said first and second directions and at an angle obtained by subtracting an angle defined by said optical axes from said angle 2θ.

34. The liquid crystal display device according to claim 31, wherein said optical axis of one of said pair of polarization plates is set within an angular range defined by either one of said first and second directions and said third direction.

35. The liquid crystal display device according to claim 31, wherein said angle 2θ is equal to or greater than 45°.

36. The liquid crystal display device according to claim 31, wherein said angle 2θ is equal to or greater than 50°.

37. The liquid crystal display device according to claim 31, wherein said angle 2θ is equal to or greater than 60°.

38. A liquid crystal display apparatus comprising:
a pair of substrates on whose opposing surfaces electrodes are formed;
a liquid crystal, exhibiting ferroelectric phases, placed between said pair of substrates, said liquid crystal having a first alignment state exhibiting a first ferroelectric phase where liquid crystal molecules are aligned substantially in a first direction in accordance with a first voltage of one polarity applied between said electrodes, a second alignment state exhibiting a second ferroelectric phase where said liquid crystal molecules are aligned substantially in a second direction in accordance with a second voltage of the other polarity applied between said electrodes, and a third alignment state where a director of said liquid crystal is directed in a third direction substantially matching with a normal-line direction of a layer of a smectic phase when no voltage is applied between said electrodes, wherein said director of said liquid crystal is directed between said first direction and said second direction in accordance with application of an arbitrary third voltage between said first voltage and said second voltage;
first and second polarization plates, arranged so as to sandwich said pair of substrates such that an optical axis of said first polarization plate is set in an angular range defined by either one of said first and second directions and said third direction, and an optical axis of said second polarization plate is substantially perpendicular or parallel to the optical axis of said first polarization plate; and
drive means for applying a voltage to said liquid crystal between said electrodes, said voltage causing said director of said liquid crystal to vary within an angular range narrower than an angle 2θ defined by said first and second directions.

39. The liquid crystal display apparatus according to claim 38, wherein said drive means applies a voltage for changing said director of said liquid crystal within a range of 45°.

40. The liquid crystal display apparatus according to claim 38, wherein said optical axis of said first polarization plate becomes substantially parallel to a fluctuation angle of said director of said liquid crystal.

41. The liquid crystal display apparatus according to claim 38, wherein said angle 2θ is equal to or greater than 45°.

42. The liquid crystal display apparatus according to claim 38, wherein said angle 2θ is equal to or greater than 50°.

43. The liquid crystal display apparatus according to claim 38, wherein said angle 2θ is equal to or greater than 60°.

44. A liquid crystal display apparatus comprising:
a pair of substrates on whose opposing surfaces electrodes are formed;
a liquid crystal, exhibiting ferroelectric phases, placed between said pair of substrates, said liquid crystal having a first alignment state exhibiting a first ferroelectric phase where liquid crystal molecules are aligned substantially in a first direction in accordance with a first voltage of one polarity applied between said electrodes, and a second alignment state exhibiting a second ferroelectric phase where said liquid crystal molecules are aligned substantially in a second direction in accordance with a second voltage of the other polarity applied between said electrodes, wherein a director of said liquid crystal is directed between said first direction and said second direction in accordance with application of an arbitrary third voltage between said first voltage and said second voltage;
a pair of polarization plates, arranged so as to sandwich said pair of substrates such that optical axes of said polarization plates become perpendicular or parallel to each other; and
drive means for applying a voltage to said liquid crystal between said electrodes, said voltage causing said director of said liquid crystal to vary within a range of an angle 2θ defined by said first and second directions and within an angular range for preventing said liquid crystal from entering a ferroelectric phase.

45. The liquid crystal display apparatus according to claim 44, wherein said liquid crystal has a third alignment state where a director of said liquid crystal is directed in a third direction substantially matching with a normal-line direction of a layer of a smectic phase when no voltage is applied between said electrodes; and
said optical axis of one of said polarization plates is set within an angular range defined by either one of said first and second directions and said third direction.

46. The liquid crystal display apparatus according to claim 44, wherein said drive means applies a voltage for changing said director of said liquid crystal within an angular range less than said angle of 2θ.

47. The liquid crystal display apparatus according to claim 44, wherein said angle 2θ is equal to or greater than 45°.

48. The liquid crystal display apparatus according to claim 44, wherein said angle 2θ is equal to or greater than 50°.

49. The liquid crystal display apparatus according to claim 44, wherein said angle 2θ is equal to or greater than 60°.

50. The liquid crystal display apparatus according to claim 44, wherein said drive means has pulse voltage applying means for applying a pulse voltage corresponding to externally supplied image data to said liquid crystal.

51. The liquid crystal display apparatus according to claim 44, wherein said drive means includes:
first pulse voltage applying means for applying a predetermined first pulse voltage to said liquid crystal; and
second pulse voltage applying means for applying a second pulse voltage corresponding to externally supplied image data in such a way that said director of said liquid crystal is changed within an angular range defined by said first and second directions.

52. The liquid crystal display apparatus according to claim 51, wherein said drive means further includes:
third pulse voltage applying means for applying a third pulse voltage equal in absolute value to said first pulse voltage but of an opposite polarity to that of said first pulse voltage, before application of said first and second pulse voltages by said first and second pulse voltage applying means; and fourth pulse voltage applying means for applying a fourth pulse voltage equal in absolute value to said second pulse voltage but of an opposite polarity to that of said second pulse voltage, before application of said first and second pulse voltages by said first and second pulse voltage applying means.

53. The liquid crystal display apparatus according to claim 51, wherein said first pulse voltage applied to said liquid crystal by said first pulse voltage applying means does not set said liquid crystal in a ferroelectric phase.

54. The liquid crystal display apparatus according to claim 44, wherein said electrodes formed on said opposing surface of one of said pair of substrates are pixel electrodes arranged in a matrix form; and said electrodes formed on said opposing surface of the other one of said pair of substrates are a common electrode formed in association with said pixel electrodes.

55. The liquid crystal display apparatus according to claim 54, wherein active elements respectively connected to said pixel electrodes are formed on said opposing surface of said one of said pair of substrates; and said drive means includes:
row selection means for selectively enabling said active elements connected to any row of pixel electrodes in said matrix;
image data writing means for applying a voltage corresponding to externally supplied image data to said pixel electrodes selected by said row selection means via said enabled active elements; and
reference voltage applying means for applying a reference voltage to said common electrode, whereby a voltage is applied to said liquid crystal by voltage application to said pixel electrodes and said common electrode.

56. The liquid crystal display apparatus according to claim 44, wherein said electrodes formed on said opposing surface of one of said pair of substrates are a plurality of scan electrodes formed in parallel to one another;

said electrodes formed on said opposing surface of the other one of said pair of substrates are a plurality of signal electrodes formed in parallel to one another and substantially perpendicular to said plurality of scan electrodes; and said drive means applies voltages to said plurality of scan electrodes and said plurality of signal electrodes to thereby apply a voltage to said liquid crystal.

57. A method of driving a liquid crystal display device comprising:

(i) a preparation step of preparing the liquid crystal display device to comprise:
a pair of substrates on whose opposing surfaces electrodes are formed;
a liquid crystal, exhibiting ferroelectric phases, placed between said pair of substrates, said liquid crystal having a first alignment state exhibiting a first ferroelectric phase where liquid crystal molecules are aligned substantially in a first direction in accordance with a first voltage of one polarity applied between said electrodes, and a second alignment state exhibiting a second ferroelectric phase where said liquid crystal molecules are aligned substantially in a second direction in accordance with a second voltage of the other polarity applied between said electrodes, wherein a director of said liquid crystal is directed between said first direction and said second direction in accordance with application of an arbitrary third voltage between said first voltage and said second voltage; and
a pair of polarization plates, arranged so as to sandwich said pair of substrates such that optical axes of said polarization plates become perpendicular or parallel to each other; and (ii) a drive step of applying a voltage to said liquid crystal between said electrodes, said voltage causing said director of said liquid crystal to vary within such an angular range as not to set said liquid crystal in a ferroelectric phase.

58. The method according to claim 57, further comprising:
a contrast compensation step of controlling said voltage to be applied in said drive step to thereby compensate a control of an image to be displayed by changing said director of said liquid crystal.

59. A method of driving a liquid crystal display device comprising:

(i) a preparation step of preparing the liquid crystal display device to comprise:
a pair of substrates on whose opposing surfaces electrodes are formed;
a liquid crystal, exhibiting ferroelectric phases, placed between said pair of substrates, said liquid crystal having a first alignment state exhibiting a first ferroelectric phase where liquid crystal molecules are aligned substantially in a first direction in accordance with a first voltage of one polarity applied between said electrodes, a second alignment state exhibiting a second ferroelectric phase where said liquid crystal molecules are aligned substantially in a second direction in accordance with a second voltage of the other polarity applied between said electrodes, and a third alignment state where a director of said liquid crystal is directed in a third direction substantially matching with a normal-line direction of a layer of a smectic phase when no voltage is applied between said electrodes, wherein said director of said liquid crystal is directed between said first direction and said second direction in accordance with application of an arbitrary third voltage between said first voltage and said second voltage; and
first and second polarization plates, arranged so as to sandwich said pair of substrates such that an optical axis of said first polarization plate is set in an angular range defined by either one of said first and second directions and said third direction, and an optical axis of said second polarization plate is substantially perpendicular or parallel to the optical axis of said first polarization plate; and (ii) a drive step of applying a voltage to said liquid crystal between said electrodes, said voltage causing said director of said liquid crystal to vary within an angular range narrower than an angle $2\theta$ defined by said first and second directions.

60. The method according to claim 59, wherein said drive step applies a voltage for causing said director of said liquid crystal to vary within a range of 45° to said liquid crystal.

61. The method according to claim 59, wherein said optical axis of said first polarization plate becomes substantially parallel to a fluctuation angle of said director of said liquid crystal.

62. The method according to claim 58, further comprising:
- a contrast compensation step of controlling said voltage to be applied in said drive step to thereby compensate a control of an image to be displayed by changing said director of said liquid crystal.

63. The method according to claim 62, wherein said drive step includes:
- a first voltage applying step of applying a first voltage corresponding to a maximum gradation of said image to be displayed to said liquid crystal; and
- a second voltage applying step of applying a second voltage corresponding to a minimum gradation of said image to be displayed to said liquid crystal.

64. The method according to claim 62, wherein said contrast compensation step includes:
- a temperature detection step of detecting a temperature of said liquid crystal; and
- a voltage compensation step of compensating said voltage to be applied to said liquid crystal in said drive step, in accordance with said temperature detected in said temperature detection step.

65. The method according to claim 64, wherein said voltage compensation step includes an applied voltage compensation step of compensating a range of a value of an applied voltage in accordance with said temperature, and an offset voltage compensation step of compensating an offset voltage in accordance with said temperature.

66. A method of driving a liquid crystal display device comprising:
- (i) a preparation step of preparing the liquid crystal display device to comprise:
  - a pair of substrates on whose opposing surfaces electrodes are formed;
  - a liquid crystal, exhibiting ferroelectric phases, placed between said pair of substrates, said liquid crystal having a first alignment state exhibiting a first ferroelectric phase where liquid crystal molecules are aligned substantially in a first direction in accordance with a first voltage of one polarity applied between said electrodes, and a second alignment state exhibiting a second ferroelectric phase where said liquid crystal molecules are aligned substantially in a second direction in accordance with a second voltage of the other polarity applied between said electrodes, wherein a director of said liquid crystal is directed between said first direction and said second direction in accordance with application of an arbitrary third voltage between said first voltage and said second voltage; and
  - a pair of polarization plates, arranged so as to sandwich said pair of substrates such that optical axes of said polarization plates become perpendicular or parallel to each other; and
- (ii) a drive step of applying a voltage to said liquid crystal between said electrodes, said voltage causing said director of said liquid crystal to vary within a range of an angle 2θ defined by said first and second directions and within such an angular range as not to set said liquid crystal in a ferroelectric phase.

67. The method according to claim 66, wherein said drive step applies a pulse voltage corresponding to externally supplied image data to said liquid crystal.

* * * * *

UNITED STATES PATENT AND TRADEMARK OFFICE
CERTIFICATE OF CORRECTION

PATENT NO. : 6,163,360
DATED : December 19, 2000
INVENTOR(S) : Tomio Tanaka

It is certified that error appears in the above-identified patent and that said Letters Patent is hereby corrected as shown below:

Column 43,
Line 1, change "claim 58" to -- claim 59 --.

Signed and Sealed this

Eighth Day of January, 2002

Attest:

JAMES E. ROGAN
Attesting Officer     Director of the United States Patent and Trademark Office